US008144203B2

(12) United States Patent
Washisu

(10) Patent No.: US 8,144,203 B2
(45) Date of Patent: Mar. 27, 2012

(54) IMAGE PICKUP APPARATUS INCLUDING IMAGE SHAKE CORRECTION

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 11/952,945

(22) Filed: Dec. 7, 2007

(65) Prior Publication Data

US 2008/0136924 A1     Jun. 12, 2008

(30) Foreign Application Priority Data

Dec. 12, 2006   (JP) ................................. 2006-335064

(51) Int. Cl.
*H04N 5/228* (2006.01)
*G03B 17/00* (2006.01)

(52) U.S. Cl. ..................................... 348/208.99; 396/55

(58) Field of Classification Search .. 348/208.1–208.11; 396/52, 53, 55, 75, 133
See application file for complete search history.

(56) References Cited

U.S. PATENT DOCUMENTS

| 5,337,098 | A | 8/1994 | Imafuji |
| 5,606,456 | A | 2/1997 | Nagata |
| 7,324,134 | B2* | 1/2008 | Sato et al. ................. 348/208.2 |
| 7,460,772 | B2* | 12/2008 | Ishikawa et al. ................ 396/52 |
| 7,639,932 | B2* | 12/2009 | Imada ............................. 396/52 |
| 7,639,933 | B2* | 12/2009 | Seo et al. ........................ 396/55 |
| 2006/0018646 | A1* | 1/2006 | Stavely ............................ 396/55 |
| 2006/0127071 | A1 | 6/2006 | Takeuchi |
| 2006/0140599 | A1* | 6/2006 | Nomura et al. ................. 396/52 |

FOREIGN PATENT DOCUMENTS

| EP | 1607792 A2 | 12/2005 |
| EP | 1686792 A2 | 8/2006 |
| JP | 7-225405 A | 8/1995 |

* cited by examiner

*Primary Examiner* — Trung Diep
(74) *Attorney, Agent, or Firm* — Canon U.S.A, Inc. IP Division

(57) ABSTRACT

An image pickup apparatus includes a first detection unit for detecting a rotation shake, a first computation unit for processing a detection signal of the rotation shake into a rotation shake correction target value, a second detection unit for detecting a parallel shake in a plane surface perpendicular to an optical axis, a second computation unit for process a detection signal of the parallel shake into a parallel shake correction target value, a shake correction unit for correcting an image shake in the plane surface of the image pickup apparatus based on the rotation and parallel shake correction target values, an initialization unit for initializing the parallel shake correction target value, and a control unit for moving the shake correction unit based on an image pickup start instruction prior to an image pickup operation while initializing the parallel shake correction target value.

8 Claims, 23 Drawing Sheets

IMAGE PICKUP APPARATUS INCLUDING IMAGE SHAKE CORRECTION

BACKGROUND OF THE INVENTION

1. Field of the Invention

The present invention relates to an image pickup apparatus including a shake correction unit arranged to correct an image shake.

2. Description of the Related Art

In modern cameras, important operations for image capture such as exposure and focus determination are automated, and the possibility for an unskilled photographer to cause an image pickup failure is extremely small. Also, recently, a camera provided with a system for preventing hand-induced image shake has been manufactured, and there are even fewer any factors for inducing the image pickup failure from the photographer.

Here, the known system for preventing image shake will be described. A camera hand movement at the time of image pickup is a vibration with a frequency of 1 to 10 Hz in usual cases. Then, in order to realize the image pickup of a photograph without being influenced by image shake even when such a hand movement is generated at the time of shutter release, it is necessary to detect the camera shake due to the hand movement and displace a shake correction unit provided with the correction optical system in accordance with the detected value.

Therefore, in order to capture the photograph without being influenced by image shake even when a camera shake is generated, first, it is necessary to detect the camera vibration precisely. Second, it is necessary to correct an optical axis change due to the hand-induced camera shake. The detection of the vibration (camera shake) can be performed in principle by detecting an acceleration, an angular acceleration, an angular rate, an angular displacement, and the like, and providing the camera with a processing or computation unit arranged to appropriately perform computation processing on the outputs. Then, based on the detection information, the shake correction unit for decentering the image pickup optical axis is driven to perform image shake correction.

FIG. 22A and FIG. 22B are a plan view and a lateral view of a conventional single-lens reflex camera, respectively. An image stabilizing system mounted to an interchangeable lens 90 which is attached to this single-lens reflex camera is arranged to perform the shake correction for a camera vertical shake and a camera lateral shake as illustrated in arrows 92$p$ and 92$y$ with respect to an optical axis 91. It is noted that the camera main body 93 includes a release member 93$a$, a mode dial (including a main switch) 93$b$, a retractable strobe light 93$c$, and a camera CPU 93$d$. In addition, reference numeral 94 denotes an image pickup element.

Reference numeral 95 denotes a shake correction unit arranged to perform the correction for the shakes in directions of arrows 92$p$ and 92$y$ by freely driving a correction lens 95$a$ functioning as a correction optical system in direction of arrows 95$p$ and 95$y$. Reference numerals 96$p$ and 96$y$ respectively denote gyros for detecting shakes about the arrows 92$p$ and 92$y$, and arrows 96$pa$ and 96$ya$ indicate the respective detection sensitivity directions.

Signals output from the gyros 96$p$ and 96$y$ are subjected to computations in a lens CPU 97 and converted into shake correction target values of the shake correction unit 95. In synchronism with a switch to be turned ON through a half press of the release member 93$a$ provided to the camera main body 93 (hereinafter referred to as switch S1: an operation switch arranged to instruct photometry and focusing for image pickup preparations), a drive target value is input to a coil of the shake correction unit 95 via a drive unit 98. With this configuration, the image shake correction is started.

In the image stabilizing system described with reference to FIGS. 22A and 22B, the gyros 96$p$ and 96$y$ are used for hand-induced shake detection. Not only the rotational movements about the arrows 92$p$ and 92$y$ (about the image pickup optical axis) but also the parallel movements illustrated in arrows 11$pb$ and 11$yb$ (parallel movements in the plane surface perpendicular to the image pickup optical axis) are applied to the camera main body 93. However, the rotational movements about the arrows 92$p$ and 92$y$ are dominant in a normal image pickup condition, and image degradation due to the parallel shakes illustrated in the arrows 11$pb$ and 11$yb$ is not apparent. For that reason, only the gyros 96$p$ and 96$y$ may be provided for hand-induced shake detection.

However, in the case of photography at an extremely close distance (in a photography condition where a photographing magnification ratio is high), the image degradation due to the parallel shakes illustrated in the arrows 11$pb$ and 11$yb$ cannot be ignored. For example, as in macro photography, a condition where the camera approaches an object at a distance of about 20 cm for picking up the image and a case where a focal distance in a photographic optical system is extremely large (for example, 400 mm) even when the object is located away from the camera by about 1 m are considered. In such cases, it becomes necessary to actively detect the parallel shake and drive the shake correction unit 95. Japanese Patent Laid-Open No. 7-225405 discloses a technology in which an accelerometer for detecting acceleration is provided to detect a parallel shake, and together with an output of a separately provided accelerometer, the shake correction unit 95 is driven.

FIGS. 23A to 23C illustrate image shake (image shift) amounts due to influences from the rotation shake and the parallel shake in a case of photography at an extremely close distance (1:1 magnification photography). The horizontal axis 101 represents an elapsed time after the camera is held, and the vertical axis 102 represents an image shake amount on the image pickup element 94. Here, the waveform 103 of FIG. 23A illustrates a time change in the image shake amount due to the parallel shake (parallel image shake). The waveform 104 of FIG. 23B illustrates a time change in the image shake amount due to the rotation shake (rotation image shake). Also, the waveform 105 of FIG. 23C illustrates the total image shake amount from the parallel shake and the rotation shake. From FIGS. 23A to 23C, the parallel image shake 103 and the rotation image shake 104 are changed over the elapsed time. However, particular attention should be given to the fact that the parallel image shake 103 is large in the case of photography at extremely close distances. Of course, the parallel image shake 103 has a small image shake amount when the object is far away or the photographing magnification ratio is small (while the zoom is set to the wide-angle end, for example). In the case of 1:1 magnification photography as in FIGS. 23A to 23C, the parallel image shake 103 causes a larger influence on the image degradation than the rotation image shake 104. Then, as the photographing magnification ratio larger, the effect is further increased. In order to correct this parallel image shake with high accuracy, it is necessary to provide a shake correction unit having a large correction stroke with which the shake amount can be corrected.

In the conventional shake correction unit, only a correction stroke limited to the correction for the rotation shake about the image pickup optical axis is provided. However, it is necessary to ensure a larger correction stroke for the correction for the parallel shake in the plane surface perpendicular to the image pickup optical axis. In the 1:1 magnification photography of FIGS. 23A to 23C, to correct both the rotation shake and the parallel shake at a high accuracy, a correction stroke at least two times larger than the conventional correction stroke is required. Here, the correction stroke and the size of the shake correction unit is in at least a proportional relation. This is because the shake correction unit (to be more specific, a correction lens) needs a twice larger stroke for performing spreading vibration with the optical axis set as the center and because the size of an actuator (a coil, a magnet, or the like) is accordingly enlarged and a drive margin is required. As a result, the weight increase of the actuator and the cost increase become also significant. As described above, if parallel shake is intended to be corrected in an application of the conventional method, the cost and weight increases are a disadvantage for apparatus intended for a normal consumer.

SUMMARY OF THE INVENTION

The present invention has been made in view of the above-described problems and the invention provides an image pickup apparatus in which high precision correction can be preformed for parallel shake in a plane perpendicular to the optical axis, while a small size and a light weight of the image pickup apparatus are maintained.

In order to achieve the above-described configuration, according to an aspect of the present invention, there is provided an image pickup apparatus including a first detection unit arranged to detect a rotation shake generated in the image pickup apparatus; a first processing unit arranged to process a detection signal of the rotation shake into a rotation shake correction target value; a second detection unit arranged to detect a parallel shake in the image pickup apparatus in a plane perpendicular to the optical axis; a second processing unit arranged to process a detection signal of the parallel shake into a parallel shake correction target value; and a shake correction unit arranged to correct an image shake generated on an image plane of the image pickup apparatus based on the rotation shake correction target value and the parallel shake correction target value, the image pickup apparatus being characterized by further including: an initialization unit arranged to initialize the parallel shake correction target value; and a control unit arranged to instruct the initialization unit to initialize, based on an image pickup start instruction of the image pickup apparatus, prior to a photographing operation, the parallel shake correction target value to move the shake correction unit.

Similarly, in order to achieve the above-described configuration, according to another aspect of the present invention, there is provided image pickup apparatus including a first detection unit arranged to detect a rotation shake in the image pickup apparatus; a first processing unit arranged to process a detection signal of the rotation shake into a rotation shake correction target value; a second detection unit arranged to detect a parallel shake in the image pickup apparatus in a plane perpendicular to the optical axis; a second processing unit arranged to process a detection signal of the parallel shake into a parallel shake correction target value; a distance detection unit arranged to detect a distance from the image pickup apparatus to an object; a shake correction unit arranged to correct an image shake generated on an image plane of the image pickup apparatus based on the rotation shake correction target value and the parallel shake correction target value; an initialization unit arranged to initialize an integrated shake correction target value which is obtained by integrating the rotation shake correction target value with the parallel shake correction target value; and an control unit arranged to instruct the initialization unit to initialize, based on an image pickup start instruction of the image pickup apparatus, in a case where the distance detected by the distance detection unit is shorter than a set value, prior to a photographing operation, the integrated shake correction target value to move the shake correction unit.

Similarly, in order to achieve the above-described configuration, according to still another aspect of the present invention, there is provided image pickup apparatus including a first detection unit arranged to detect a rotation shake in the image pickup apparatus; a first processing unit arranged to process a detection signal of the rotation shake into a rotation shake correction target value; a second detection unit arranged to detect a parallel shake in the image pickup apparatus in a plane perpendicular to the optical axis; a second processing unit arranged to process a detection signal of the parallel shake into a parallel shake correction target value; a shake correction unit arranged to correct an image shake generated on an image plane of the image pickup apparatus based on the rotation shake correction target value and the parallel shake correction target value; a gain change unit arranged to change a gain of the parallel shake correction target value; and a control unit arranged to operate the shake correction unit to leave a correction leftover for the parallel shake by lowering the gain by the control unit until an image pickup start instruction of the image pickup apparatus is issued and to operate the shake correction unit to clear the correction leftover by setting the gain as 1 by the gain change unit after the image pickup start instruction is issued.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Exemplary Embodiment

Figure 1A:
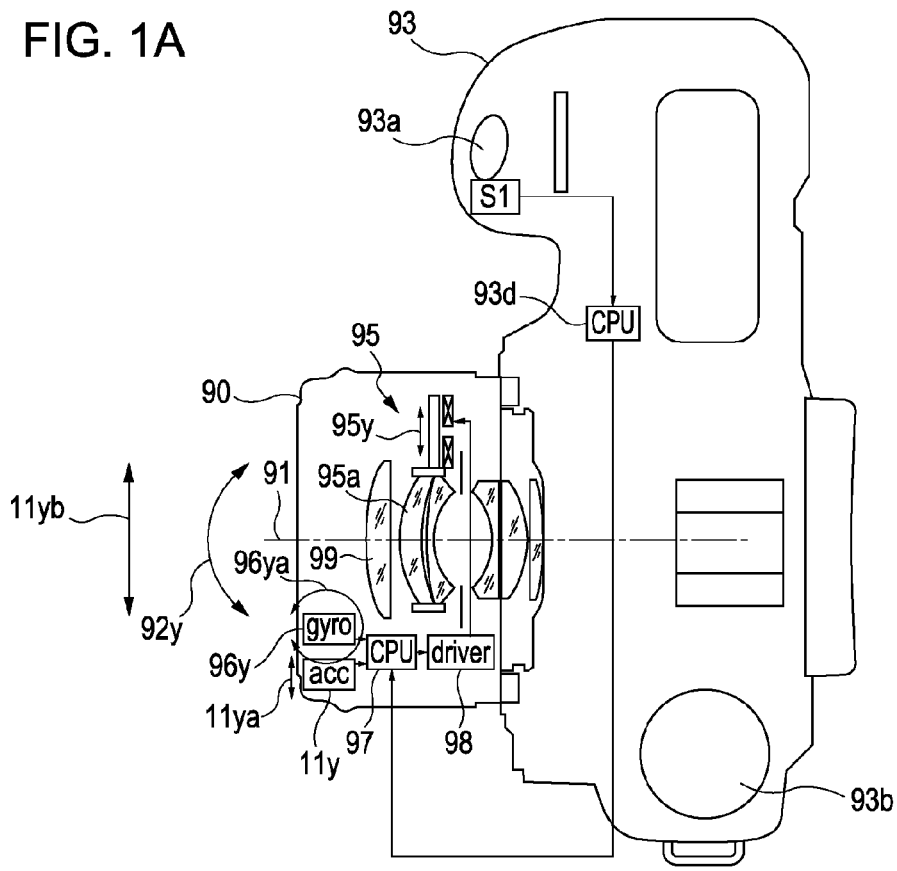
FIGS. 1A and 1B are a top view and a lateral view of a camera according to a first exemplary embodiment of the present invention, respectively.
Figure 1B:
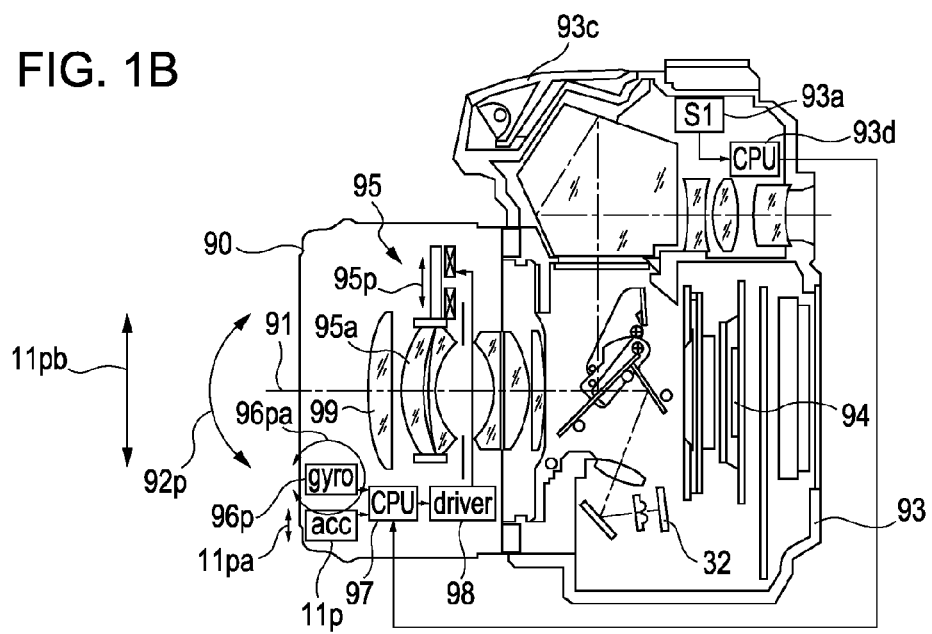
Figure 22A:
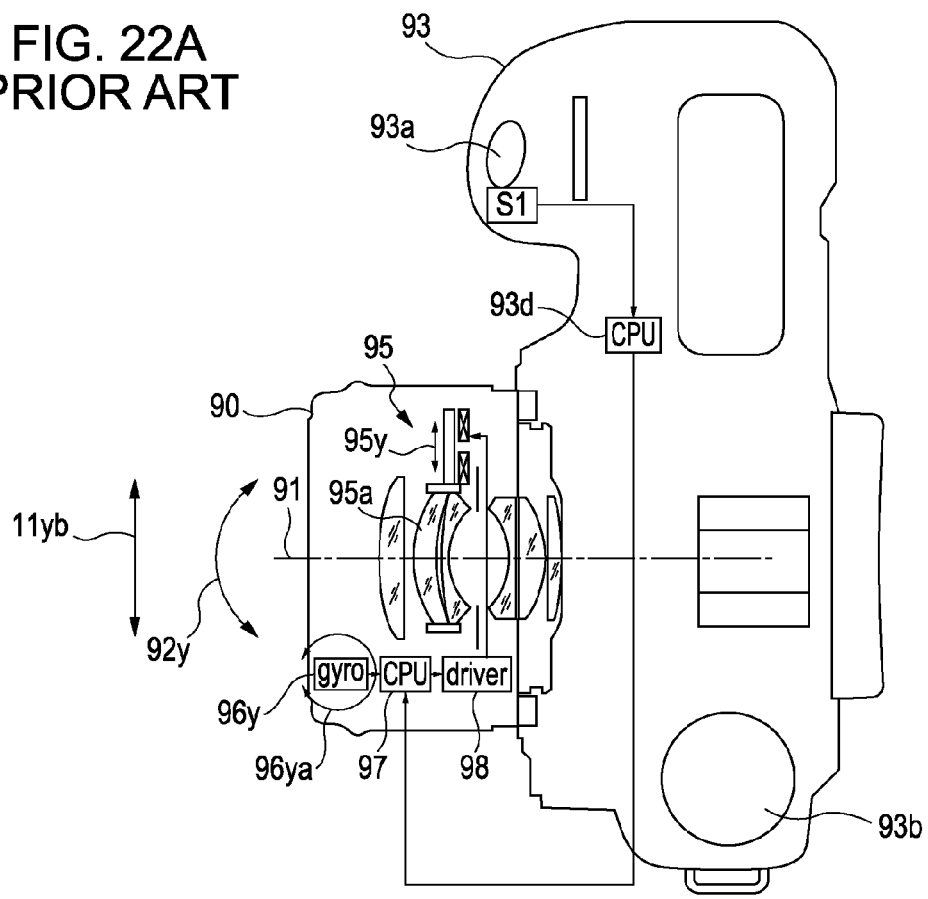
FIGS. 22A and 22B are a top view and a lateral view of a conventional camera, respectively.
Figure 22B:
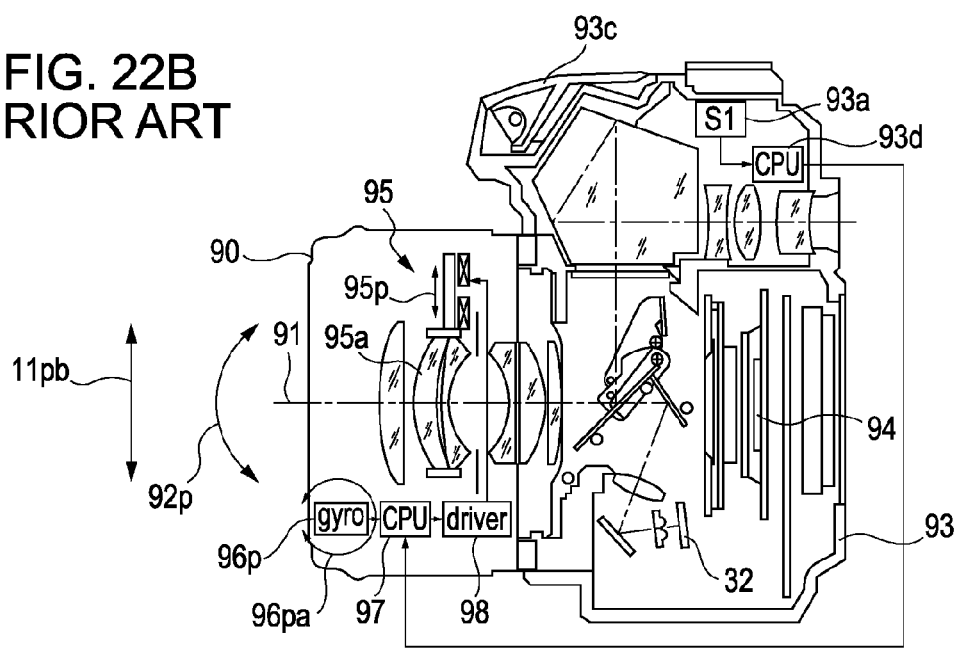

FIGS. 1A and 1B are a top view and a lateral view of a camera functioning as an image pickup apparatus according to a first exemplary embodiment of the present invention. A difference from the conventional example of FIGS. 22A and 22B resides in that accelerometers $11p$ and $11y$ are provided. Accelerator detection axes of the respective accelerometers $11p$ and $11y$ are represented by arrows $11pa$ and $11ya$.

Figure 2:
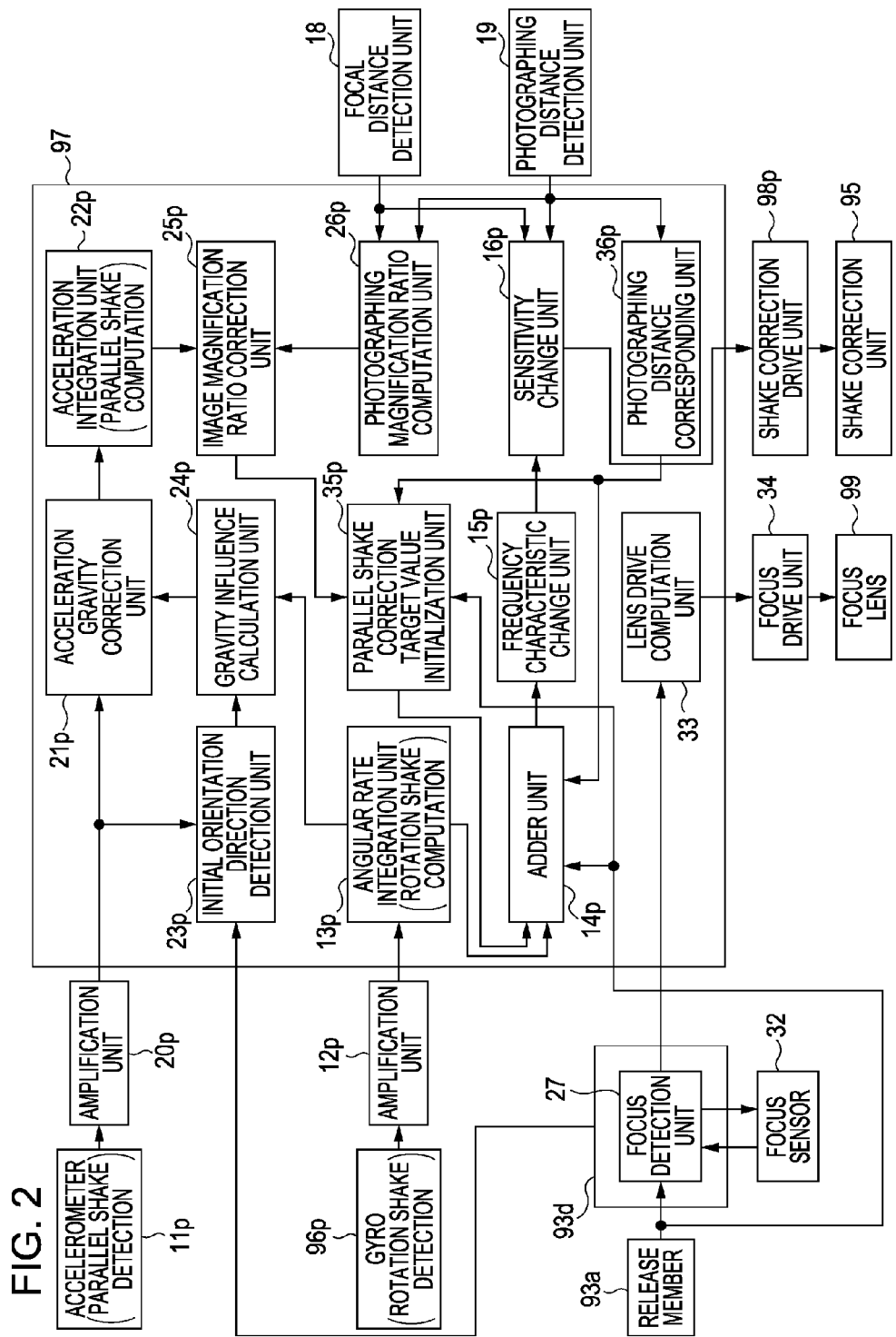
FIG. 2 is a block diagram of a circuit configuration example of the camera according to the first exemplary embodiment of the present invention.

FIG. 2 is a block diagram of a processing unit performing processing on signals of parallel shakes detected by the parallel shake detectors (hereinafter referred to as accelerators) $11p$ and $11y$, and rotation shakes detected by rotation shake detectors (hereinafter referred to as gyros) $96p$ and $96y$. This processing is mainly performed by the lens CPU 97. It is noted that FIG. 2 only illustrates signal processing for correcting image shake due to vertical shakes of the camera (the rotation shake $92p$ and the parallel shake $11pb$ in FIG. 1B). However, in actuality, a correction on an image shake due to lateral shakes of the camera (the rotation shake $92y$ and the parallel shake $11yb$ in FIG. 1B) is also subjected to signal processing.

In FIG. 2, a hand shake angular rate signal of the gyro $96p$ is input to an amplification unit $12p$. In the amplification unit $12p$, the output of the gyro $96p$ is not only amplified simply, but also a DC removal circuit for removing a DC component and a high frequency attenuation circuit for removing a high frequency noise component are provided (not shown). The output of the amplification unit $12p$ is subjected to A/D conversion and taken into the lens CPU 97. The taken-in signal is subjected to numeric processing in the lens CPU 97, but herein the process is divided into blocks for sake of the description.

A rotation shake computing unit (hereinafter referred to as angular rate integration unit) $13p$ performs first-order integration on the hand shake angular rate signal input from the amplification unit $12p$ to be converted into a rotation shake correction target value (hereinafter referred to as hand shake angle). The angular rate integration unit $13p$ performs integration on high frequency components equal to or higher than about 0.1 Hz in usual cases in the hand shake angular rate signal to be converted into the hand shake angle. However, at the start of the angular rate integration, the integration zone can be narrowed (for example, a signal equal to or lower than 2 Hz can be attenuated). The activation of this signal processing is prompted (which is referred to as time constant switch). The obtained hand shake angle signal is input to an adder unit $14p$ and added with a hand shake displacement signal, which will be described later, before being converted into a hand shake integrated signal. It is noted that the adder unit $14p$ adds the hand shake angle signal with the hand shake displacement signal described later based on the release member 93a and a signal from a focus detection unit 27. The adder unit $14p$ receives the hand shake angle signal in response to a switch S1 which is turned ON through a half press operation of the release member 93a, and performs an addition of the hand shake displacement signal and the hand shake angle signal based on a signal input of the focus detection unit 27 (i.e. when the focusing completed).

The hand shake integrated signal is input to a frequency characteristic change unit $15p$ and a frequency characteristic is changed. The frequency characteristic change unit $15p$ is arranged to mainly attenuate low frequency components of the hand shake integrated signal. The frequency characteristic change unit $15p$ sets a frequency threshold with which frequencies lower than the threshold are determined to be attenuated (for example, 0.1 Hz, or 5 Hz) and the corresponding signal components are attenuated. This is because when a large change in the hand shake is caused as in a framing change in the camera, the attenuation of the hand shake integrated signal is set larger (for example, signals equal to or lower than 5 Hz are attenuated), and the shake correction is not performed. If the frequency characteristic change unit $15p$ is not provided, even framing movements of the camera are subjected to the shake correction, and it is therefore impossible to perform satisfactory camera framing.

The output of the frequency characteristic change unit $15p$ is input to a sensitivity change unit $16p$. The sensitivity change unit $16p$ receives signals from a focal distance detection unit 18 and a photographing distance detection unit 19 input to the lens CPU 97 to change the gain of the signal in the frequency characteristic change unit 15p.

In general, a shake correction sensitivity of an optical system of the shake correction unit 95 included in a zoom lens varies depending on the focal length or the focusing distance. For example, when the shake correction unit 95 is driven by 1 mm when the zoom is at the wide-angle end, the image on an image plane is also shifted by 1 mm. In this case, if the shake correction unit 95 is driven by 1 mm when the zoom is at the telephoto end, the image plane is shifted by 3 mm. Similarly, when an object is at an extremely close distance and when the object is at infinity, a relation between the drive amount of the shake correction unit 95 and the image shake amount changes. For that reason, in order to correct the sensitivity (for example, the gain is set one third when at the telephoto end), the gain of the signal of the frequency characteristic change unit 15p is changed depending upon the focal length or the focusing distance. It is noted that the focal distance (length) detection unit 18 is provided in the lens and composed of an encoder or the like which detects the position of the lens which is moved when zooming. A focal distance is detected by an output of the encoder. In addition, the photographing distance detection unit 19 is also provided in the lens and composed of an encoder or the like which detects a position of the lens which is moved when focusing. A photographing distance is detected by an output of the encoder.

In this manner, from the sensitivity change unit 16p, an integrated shake correction target value in which the hand shake angle signal (rotation shake correction target value) and the hand shake displacement signal (parallel shake correction target value) are added and frequency and gain processing are performed is output.

When the switch S1 is turned ON through the half press operation of the release member 93a, the integrated shake correction target signal from the sensitivity change unit 16p is converted into a PWM signal and input to a shake correction drive unit 98p. In the shake correction drive unit 98p, the shake correction unit 95 is driven in accordance with the input PWM signal to perform the image shake correction.

At an early stage when the switch S1 is turned ON, only the hand shake angle signal is input to the adder unit 14p, and therefore only the correction for the rotation shake is performed. Also, in accordance with the switching ON of the switch S1, the focus detection unit 27 in the camera CPU 93d drives a focus sensor 32 in the camera main body 93 to detect the focus state of the photograph object. Then, based on the detection result of the focus sensor 32, the focus detection unit 27 sends the focus deviation amount to a lens drive computation unit 33 in a lens micro computer 97. The lens drive computation unit 33 drives a focus drive unit 34 based on the signal to move a focus lens 99. Here, the correction for the rotation shake is performed while the above-described focus operation is performed, and it is therefore possible to realize the high precision focus operation.

After the drive of the focus lens 99, the focus sensor 32 detects the focus state of the object again. In a case of a sufficient focus state, the focus display is performed (in a case of the insufficient focus state, the lens is moved again). Also, when the sufficient focus state is achieved, the photographing distance detection unit 19 instructs the adder unit 14p via a photographing distance corresponding unit 36p to add the hand shake displacement signal with the hand shake angle signal. The feed amount of the focus lens 99 is continuously input to the sensitivity change unit 16p. The sensitivity change unit 16p sets the feed amount of the focus lens 99 (the signal of the photographing distance detection unit 19) when the focus detection unit 27 is focused as a vibration control sensitivity value.

Here, the photographing distance corresponding unit 36p receives the output of the photographing distance detection unit 19. Then, a signal for determining whether the signal (object distance) is subjected to the shake correction by adding the hand shake displacement signal with the hand shake angle signal (when the object distance is close, the hand shake displacement is added), and also a signal for determining whether initialization is necessary to be performed on a parallel shake correction target value initialization unit 35p, which will be described later, are output.

As will be described later, from the positional relation between the feed amount of the focus lens and the zoom lens, the photographing magnification ratio is computed. However, the computation of the photographing magnification ratio is also started by using the focus detection of the focus detection unit 27 as a trigger based on the signals of the focal distance (length) detection unit 18 and the photographing distance detection unit 19. That is, after the zoom is set and the focus is on the photograph object, when the feed amount of the focus lens is found out, the sensitivity for the rotation shake is found out and the integrated shake correction target value is calculated. It is noted that the zoom is set by the photographer before the half press operation of the release member 93a is performed. The image magnification factor is also found out when the focus is set on the photograph object.

The shake correction amount target signal obtained in the above-described manner to which the hand shake angle signal and the hand shake displacement signal are added is converted into a PWM signal and input to the shake correction drive unit 98p. In the shake correction drive unit 98p, the shake correction unit 95 is driven in accordance with the input PWM signal to perform the image shake correction. That is, such a configuration is adopted that the correction for the parallel shake is also performed when the focusing is ended.

Next, a description will be provided of signal processing or the accelerometer 11p. The hand shake acceleration signal of the accelerometer 11p is input to an amplification unit 20p. In the amplification unit 20p, the output of the accelerometer 11p is not only amplified, but also a DC removal circuit for removing a DC component and a high frequency attenuation circuit for removing a high frequency noise component are provided. The output of the amplification unit 20p is subjected to A/D conversion and taken into the lens CPU 97. The taken-in hand shake acceleration signal is also subjected to numeric processing in the lens CPU 97, but herein the process is also divided into blocks for sake of the description.

First, the hand shake acceleration signal is input to an acceleration gravity correction unit 21p and the correction for gravity components is performed. Now, the correction for gravity components is described. At an image pickup position of the camera illustrated in FIG. 1B, the camera is set horizontal, and thus the sensitivity direction 11pa of the accelerometer 11p faces the same direction as a gravity direction 28 (refer to FIG. 3A). At this time, the accelerometer 11p regularly outputs signals which reflect the gravity components, and the detection of parallel shake components superimposed upon the gravity components. Here, as the signal outputs of the gravity components are DC components, the gravity signal outputs can be removed by the DC removal circuit or the like in the amplification unit 20p.

Figure 3A:
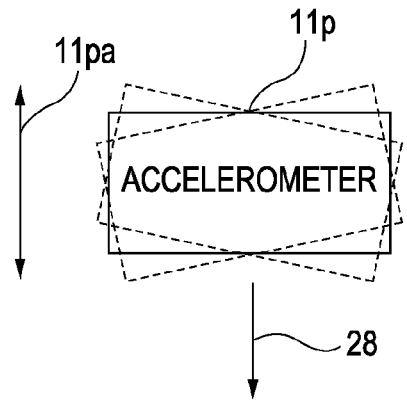
FIGS. 3A to 3C are explanatory diagrams for describing a gravity error applied to an accelerator according to the first embodiment of the present invention.

However, due to the change in the rotation angle of the hand shake generated when the camera is held, as illustrated in a broken line in FIG. 3A, the position of the accelerometer 11p is changed. Thus, the gravity direction is changed when viewed from the accelerometer 11p. For that reason, the output of the accelerometer 11p is changed due to the change in the hand shake angle.

Figure 3B:
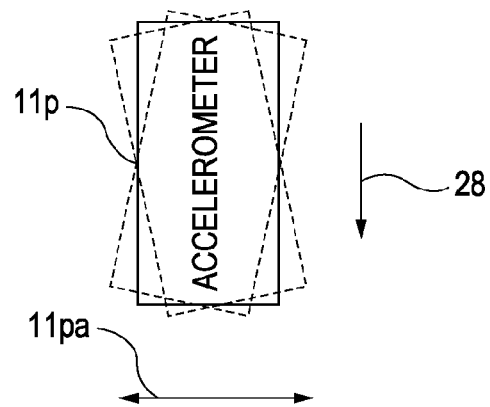
Figure 3C:
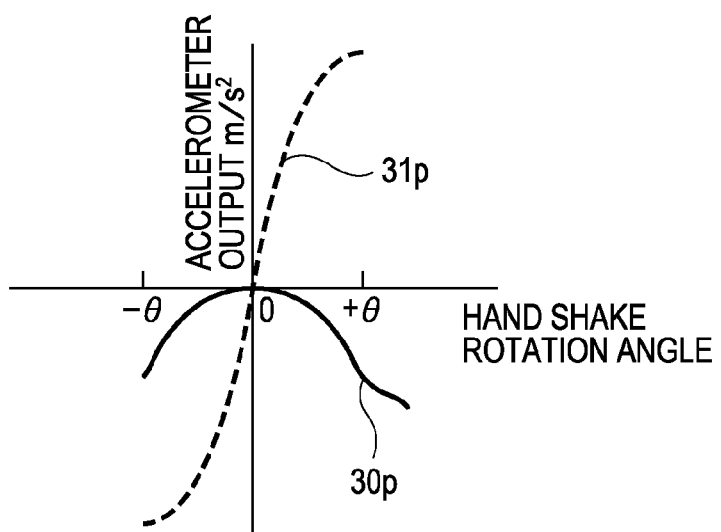

FIG. 3C illustrates a change in the output of the accelerometer 11p with respect to an orientation of the accelerometer 11p. The lateral axis represents an orientation change of the accelerometer 11p (hand shake rotation angle θ) and the vertical axis represents an output of the accelerometer 11p. A waveform 30p represents the output of the accelerometer 11p. When the orientation angle of the accelerometer 11p is changed from 0 (in a state where 1 G is applied as in FIG. 3A) through the orientation change of ±θ, the output of the accelerometer 11p is accordingly changed (decreased).

Figure 4A:
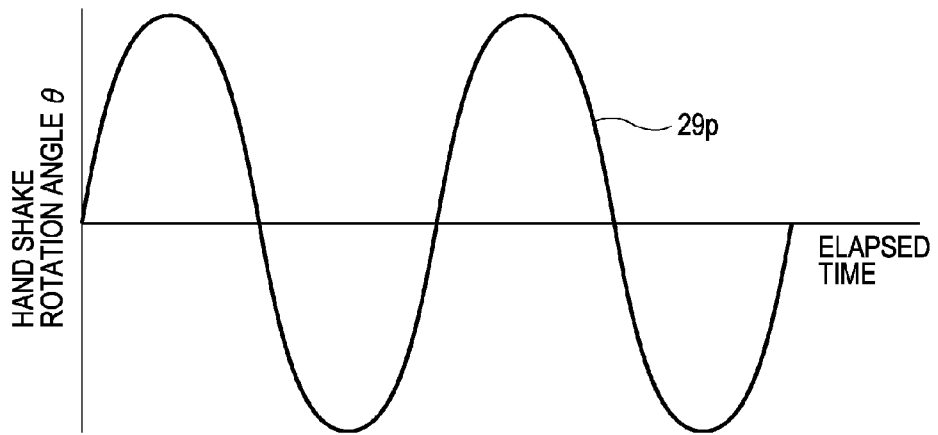
FIGS. 4A and 4B illustrate a relation between time and the hand shake angle and a relation between time and the output of the accelerator according to the first exemplary embodiment.
Figure 4B:
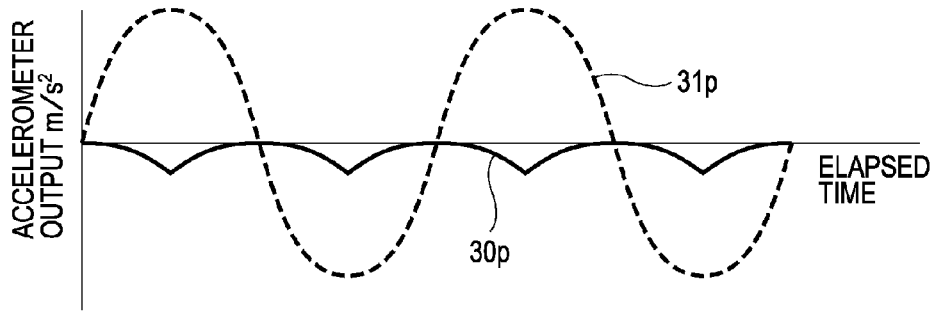

FIGS. 4A and 4B illustrate outputs of the accelerometer 11p due to gravity change, in which the lateral axis represents an elapsed time after the camera is held and the vertical axis alternately represents the hand shake angle and the output of the accelerator.

At this moment, even if the parallel shake is not generated at all, the accelerator outputs an error signal 30p due to the influences of the gravity component change by the hand shake rotation angle 29p. In a case of close distance image pickup, the cameral is faced down for the image pickup in many cased. FIG. 3B illustrates such a case where a gravity direction 28 is perpendicular to the sensitivity direction 11pa of the accelerometer 11p. The error signals in this case are represented by broken lines in FIGS. 3C and 4B.

Here, the arrangement of the accelerometer 11p in FIG. 3A and the arrangement of the accelerometer 11p in FIG. 3B generate a difference in the size of error signals 30p and 31p. This is because an influence of the gravity by cosine is generated in the arrangement of FIG. 3A with respect to the change in the hand shake angle and an influence of the gravity by sine is generated in the arrangement of FIG. 3B. When the orientation change angle is small, the change by sine is large. For that reason, in order to correct this influence of the gravity, it is necessary to detect the hand shake angle and find out the orientation of the accelerometer 11p (the sensitivity angle is at which angle with respect to the gravity as in the difference between FIGS. 3A and 3B).

Returning to FIG. 2, the lens CPU 97 receives the ON signal of the switch S1 in accordance with the half press operation is input from the release member 93a via the camera CPU 93d. The half press of the release member 93a is an operation performed after the photograph composition is determined for the image pickup preparations. After the operations, the photometry for the object and the focus operation are started. In FIG. 2, the above-described operations are not directly related to the invention and thus are omitted. The ON signal of the switch S1 is input to an initial orientation direction detection unit 23p. The acceleration amplification signal from the amplification unit 20p also is input to the initial orientation direction detection unit 23p, and the orientation of the accelerometer 11p is determined based on the size of the acceleration amplification signal when the ON signal of the switch S1 is input.

As the half press of the release member 93a is the operation performed after the photographer determines the composition, there is no large change in the orientation. For that reason, it is effective to determine the orientation of the accelerometer 11p based on the ON signal of the switch S1 in accordance with the operation. Of course, after the switch S1 is turned ON and focusing is performed in the camera, the orientation may be detected, but in that case, the integration on the output of the accelerometer 11p (described later) cannot be performed while the time from the turning of ON of the switch S1 to achieve focus is utilized. For saving time, it is desirable to detect the orientation of the accelerometer 11p at the time of turning ON of the switch S1. The determination on the orientation of the accelerometer 11p is performed in the following manner. When the acceleration at the time of turning on the ON signal of the switch S1 is 1 G, the accelerometer 11p corresponds to the orientation of FIG. 3A. When the acceleration is 0 G, the accelerometer 11p corresponds to the orientation of FIG. 3B. When the acceleration is between 0 G and 1 G, the accelerometer 11p is determined to correspond to the orientation depending on the value.

The hand shake angle signal from the angular rate integration unit 13p is input not only to the above-described adder unit 14p but also to a gravity influence calculation unit 24p. The gravity influence calculation unit 24p calculates the change in the force due to gravity applied to the accelerometer 11p based on the change in the hand shake angle. However, as described above, the calculation method varies depending on the orientation of the gravitational force with respect to the accelerometer 11p (whether the calculation is performed by sine or cosine). For that reason, the signal of the initial orientation direction detection unit 23p is also input to the gravity influence calculation unit 24p, and the coefficient for the calculation is changed in the orientation of FIG. 3A and the orientation of FIG. 3B. To be more specific, when an orientation φ to which 1 G is applied as in FIG. 3A is set as 0 degree and a change in the orientation is set as θ, the change in the output of the accelerometer 11p can be obtained from G (COS φ−COS (φ+θ)). For that reason, φ is obtained by the initial orientation direction detection unit 23p and θ is obtained by the hand shake angle to be used for the gravity influence calculation.

The hand shake acceleration amplification signal from the amplification unit 20p is input to the acceleration gravity correction unit 21p, a difference to the signal change of the accelerometer 11p in accordance with the gravity change found out in the gravity influence calculation unit 24p is calculated. Then, the output error of the accelerometer 11p due to the influence of gravity is removed. The hand shake acceleration output from which the error component is removed is input to a parallel shake computation unit (hereinafter referred to as acceleration integration unit) 22p. The acceleration integration unit 22p performs second-order integration on the hand shake acceleration signal in which the influence of the gravity is corrected, which is input from the acceleration gravity correction unit 21p, to be converted into a parallel shake correction target value (hereinafter referred to as hand shake displacement). The acceleration integration unit 22p performs second-order integration on high frequency components equal to or higher than 0.4 Hz in usual case among the hand shake acceleration signals similarly to the angular rate integration unit 13p, to be converted into the hand shake displacement. In the acceleration integration unit 22p, the integration zone of the acceleration signal is narrowed at the start of the integration (for example, the integration is performed on only components equal to or higher than 1 Hz) and thus the activation of this signal processing is prompted to the user (for example by a time constant switch).

The hand shake displacement signal of the acceleration integration unit 22p is input to an image magnification ratio correction unit 25p. A photographing magnification ratio computation unit 26p calculates the photographing magnification ratio based on focal distance (i.e. focal length) information obtained by the focal distance (focal length) detection unit 18 and photographing distance (i.e. focusing distance) information obtained by the photographing distance detection unit 19. As described above, the focal distance (focal length) detection unit 18 is provided in the lens, and is composed of an encoder or the like which detects the position of the lens moving during zooming. The focal distance (focal length) is detected by an output of the encoder. In addition, the photographing distance detection unit 19 is also provided in the lens. The photographing distance detection unit 19 is composed of an encoder or the like which detects the position of the lens moving during focusing. The photographing distance is detected by an output of the encoder.

As described above, the movement of the focus lens 99 is performed by the focus drive unit 34. After the movement is completed, when the focus detection unit 27 confirms the focused state, the photographing magnification ratio computation unit 26p performs the computation of the photographing magnification ratio based on the outputs of the focal distance (focal length) detection unit 18 and the photographing distance detection unit 19. The influences on the screen from the parallel shakes 11pb and 11yb become large when the object is close and a photographing focal length is large (when the photographing magnification ratio is high), and the influences on the screen hardly occur when the object is far away (when the photographing magnification ratio is low). For that reason, it is necessary to amplify the hand shake displacement detected and computed by the accelerometers 11p and 11y in accordance with the photographing magnification ratio.

The image magnification ratio correction unit 25p performs the amplification of the hand shake displacement in the acceleration integration unit 22p based on the computed value of the photographing magnification ratio computation unit 26p (when the focal length is long and the object distance is close, the photographing magnification ratio is computed to be high). The output of the image magnification ratio correction unit 25p is input to the parallel shake correction target value initialization unit 35p. The parallel shake correction target value initialization unit 35p initializes the parallel shake correction target value, when the image pickup start instruction is issued. That is, the output of the parallel shake correction target value initialization unit 35p becomes 0 at the time of the full press operation of the release member 93a, and thereafter the output target value is continuously provided. Alternatively, the parallel shake correction target value initialization unit 35p sets the parallel shake correction target value to a predetermined value (for example, 90% of the entire range of the parallel shake correction target value) at the time of the full press operation of the release member 93a, and thereafter the output target value may be continuously provided.

It is noted that the signal of the photographing distance corresponding unit 36p is also input to the parallel shake correction target value initialization unit 35p. Only when the photographing distance is closer than the set value (for example, the photographing distance is 30 cm), the parallel shake correction target value initialization unit 35p is operated to provide an output target value. This operation may be controlled not only with the object distance but alternatively or in addition with the photographing magnification ratio. Only when the photographing magnification ratio becomes larger than a predetermined value is the parallel shake correction target value initialization unit 35p operated to provide an output target value.

The adder unit 14p adds the signal of the angular rate integration unit 13p with the signal of the parallel shake correction target value initialization unit 35p. As described above, when the object is far and the photographing focal length is short, substantially only the output of the angular rate integration unit 13p is generated. The subsequent operations after the adder unit 14p are the same as described above.

In accordance with the frequency characteristic change unit 15p and the sensitivity of the optical system for facilitating the framing change for the camera, the shake correction target value is obtained through the sensitivity change unit 16p for adjusting the effectiveness of the image shake correction. Then, the shake correction unit 95 is driven.

Figure 5:
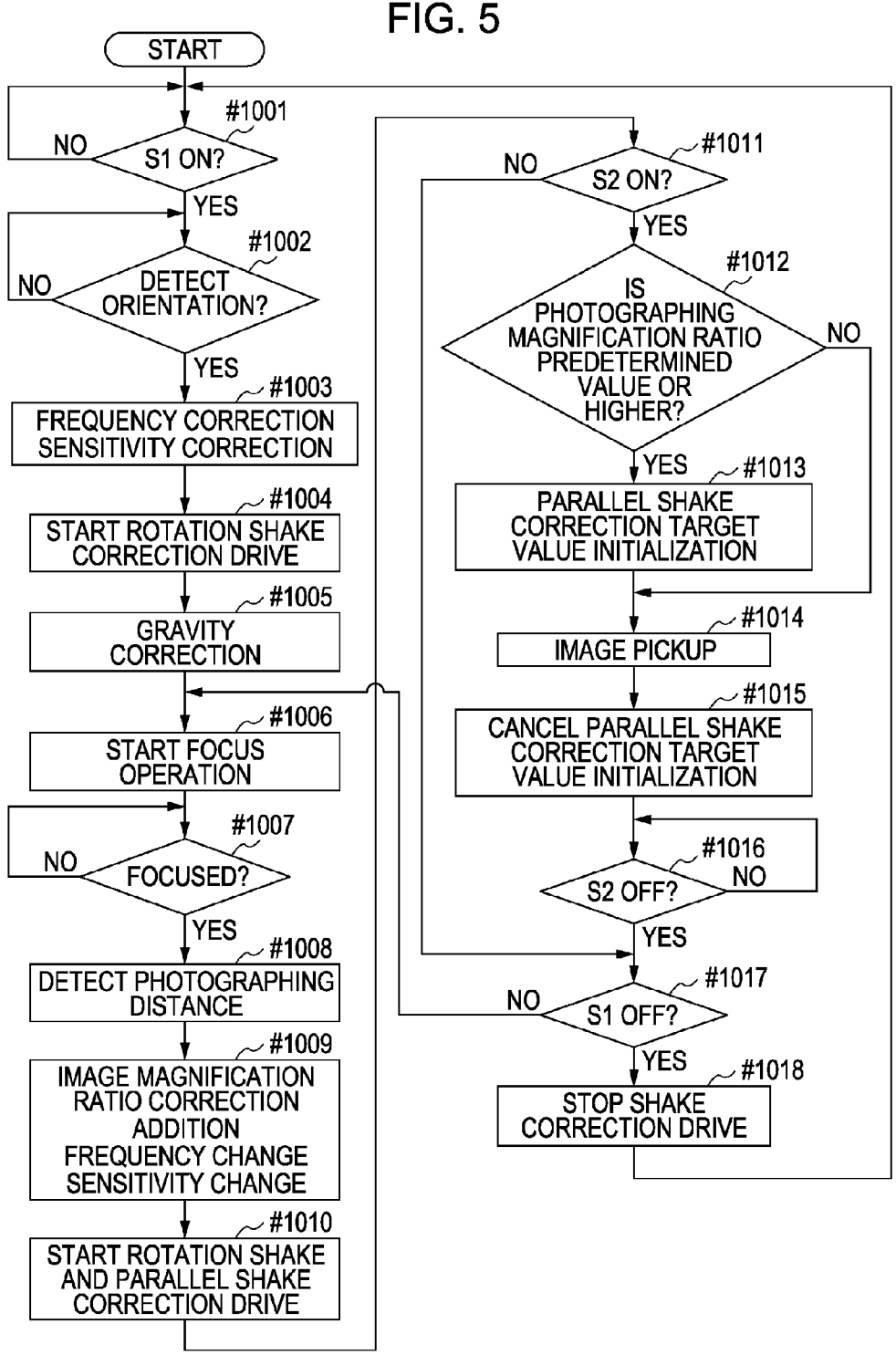
FIG. 5 is a flowchart illustrating operations of a main part of the camera according to the first exemplary embodiment of the present invention.

FIG. 5 is a flowchart illustrating a series of operations in the above-described configuration. This flow is started when a main power supply of the camera is turned ON. It is noted that for comprehensively describing the main configuration of the present invention, various control steps provided in the camera (for example, manipulations, operations, etc., for battery check, photometry, ranging, lens drive for AF, flash lamp charge, and image pickup) are omitted. Also, in the following flow, a description will be provided of a case as an example where the rotation shake and the parallel shake 11pb of the camera 92p are detected by the gyro 96p and the accelerometer 11p. However, a similar flow is applied also in a case where the rotation shake of the camera 92y and the parallel shake 11yb are detected by using the gyro 96y and the accelerometer 11y.

Referring to FIG. 5, in Step #1001, the flow stands by until turning ON of the switch S1 through the half press operation of the release member 93a, and when the switch S1 is turned ON, the flow is advanced to Step #1002. In Step #1002, the initial orientation direction detection unit 23p detects the orientation of the camera by way of the accelerometer 11p. This operation is to detect the gravity force (acceleration) applied to the accelerometers 11p and 11y. For example, as illustrated in FIGS. 1A and 1B, in a case where the camera is horizontally held, the accelerometer 11p outputs 1 G and the accelerometer 11y outputs 0 G. In this state, when the camera is vertically held (this case corresponds to the horizontal state but the composition is set vertical), the accelerometer 11p outputs 0 G and the accelerometer 11y outputs 1 G. In addition, in a case where the camera is held downward or upward, the accelerometers 11p and 11y both output 0 G.

A reason why the orientation is detected at the timing of the half press operation of the release member 93a is that as the photographer holds the camera to determine the framing and performs the half press operation of the release member 93a after the stability is attained, the change in the orientation afterwards is small. In a case where the orientation of FIG. 1A is determined based on the accelerometers 11p and 11y, the gravity correction is performed on the output of the accelerometer 11p. However, the gravity influence calculation unit 24y determines that the gravity correction is not performed on the output of the accelerometer 11y, and the correction amount of the gravity acceleration correction unit 21y is set as 0. This is because the gravity acceleration due to the rotation shake originally does not exist. That is, an acceleration gravity correction unit 21y (although not shown, having a similar configuration to the acceleration gravity correction unit 21p to correct the gravity influence of the accelerometer 11y) does not perform the correction for gravity components on the amplification signal of the accelerometer 11y.

On the other hand, in a case where the camera is held vertically (the accelerometer 11p=0 G, the accelerometer 11y=1 G), the gravity correction of the accelerometer 11y is performed based on the signal of the gyro 96y. However, the gravity correction of the accelerometer 11p is not performed based on the signal of the gyro 96p. That is, the gravity influence calculation unit 21p sets the correction amount of the gravity acceleration correction unit 21p as 0. In a case where the camera is held downward or upward (the accelerometer 11p=±1, the accelerometer 11y=±1 G), the gravity correction of the accelerometer 11p is performed based on the signal of the gyro 96p is performed, and the gravity correction of the accelerometer 11y is performed based on the signal of the gyro 96y.

As described above, it is determined whether the gravity correction is performed in accordance with the orientation. It is noted that not only the gravity acceleration but also the acceleration due to the parallel shake are superimposed in the signals from the accelerometers 11p and 11y. For that reason, the signals of the accelerometers 11p and 11y are averaged over a predetermined period of time (for example, 1 second) to take out only the gravity components.

When the orientation detection is ended as described above, the flow is advanced to Step #1003, and the sensitivity correction conforming to the lens state and the frequency correction conforming to the shake state (panning, etc.) are performed with respect to the hand shake angle signal. Next in Step #1004, the rotation shake correction based on the hand shake angle signal is started. Subsequently in Step #1005, based on the orientation of the camera detected by the initial orientation direction detection unit 23p and the hand shake angle information from the angular rate integration unit 13p, the gravity influence calculation unit 24p calculates the gravity acceleration signal included in the signal from the accelerometer 11p and the acceleration gravity correction unit 21p corrects the output accordingly.

Next in Step #1006, the focusing operation is started. Then, next in Step #1007, the flow stands by until completion of the lens movement for focusing. That is, the focus detection unit 27 detects the focus state of the object by using the focus sensor 32, and the lens drive computation unit 33 computes the focus lens drive amount. After that, the flow stands by until the focus sensor 32 confirms that the object is focused again after the focus lens 99 is driven by the focus drive unit 34. Subsequently, in Step #1008, when the lens movement is completed in Step #1007, the movement amount of the lens is read by a focus encoder to detect a photographing distance (object distance).

Next in Step #1009, focal length information of the lens is detected from a zoom encoder functioning as the focal distance (focal length) detection unit 18, and from the relation with the photographing distance obtained in Step #1008, the photographing magnification ratio computation unit 26p computes the photographing magnification ratio. Then, the image magnification ratio correction unit 25p changes the gain of the hand shake displacement in the acceleration integration unit 22p based on the result of the photographing magnification ratio computation unit 26p. The adder unit 14p adds the result with the hand shake angle signal from the angular rate integration unit 13p, and the frequency characteristic change unit 15p changes the shake correction frequency band in accordance with the photographing state or user settings. The gain of the output afterwards is changed by the sensitivity change unit 16p based on the vibration control sensitivity obtained by the above-described focal distance (focal length) detection unit 18 and the photographing distance detection unit 19, and the shake correction target value is calculated.

Next in Step #1010, based on the obtained shake correction target value, the shake correction unit 95 is driven to perform the image shake correction. At this point, corrections for both the rotation shake and the parallel shake are performed for the first time. Next in Step #1011, the state of the switch S2 is checked. When turning OFF of the switch S2 is detected, the flow is advanced to Step #1017, where whether turning OFF of the switch S1 is checked. At this time, when turning ON of the switch S1 is continued, the flow is returned to Step #1006, the similar operation is continued. That is, as long as turning ON of the switch S1 is continued, while the gain of the shake correction target value is changed conforming to the image magnification factor and the sensitivity which change in accordance with the photographing distance (the object distance), the image shake correction is continued. During that period, there is no change in the orientation of the accelerometer 11p for the gravity correction. It is noted that when the lens is in the focused state, the focus drive of the lens is not performed. When the focused state is not detected (for example, when the position of the object is moved), the lens is driven in Step #1007 to perform the focus operation. Next in Step #1008, the photographing distance is detected again to calculate the photographing magnification ratio.

When turning ON of the switch S2 is detected in the above-described Step #1011, the flow is advanced to Step #1012, where the photographing magnification ratio is determined. As the result of the determination, when the photographing magnification ratio is equal to or larger than a predetermined value, the flow is advanced to Step #1013. Prior to a photographing operation, the parallel shake correction target value initialization unit 35p is operated. This operation in Step #1013 will be described later based on FIGS. 6A to 6C and FIGS. 7A to 7C. When the photographing magnification ratio is not equal to or larger than the predetermined value, the flow skips Step #1013 and is advanced to Step #1014. That is, when the photographing distance is far (or the photographing magnification ratio is small) due to the photographing distance corresponding unit 36p, in Step #1013 the parallel shake correction target value initialization unit 35p is not operated and the flow is advanced to Step #1014.

In Step #1014, image pickup is performed. When the image pickup is ended, the flow is advanced to Step #1015, the parallel shake correction target value is returned to the value before the initialization (only when the parallel shake correction target value is initialized). This will be also described in detail based on FIGS. 7A to 7C. Next in Step #1016, whether the switch S2 is turned OFF is checked. In the case where the switch S2 is not turned OFF, the flow waits at Step #1016. After that, when the switch S2 is turned OFF, the flow is advanced to Step #1017, where the state of the above-described switch S1 is determined. In Step #1017, when it is detected that the switch S1 is also turned OFF, the flow is advanced to Step #1018, where the drive of the shake correction unit 95 is stopped. Then, the flow is returned to Step #1001, and the flow stands by until turning ON of the switch S1 again.

As described above, according to the first exemplary embodiment, such a configuration is adopted that the correction for the rotation shake is performed first (#1004), and only after the focus state is achieved is the correction for the parallel shake performed (#1010). In this manner, as the correction for the rotation shake is performed prior to the focus operation, the focus accuracy can be increased, and also the information used for performing the parallel shake correction (the photographing magnification ratio) can be accurately obtained.

Figure 6A:
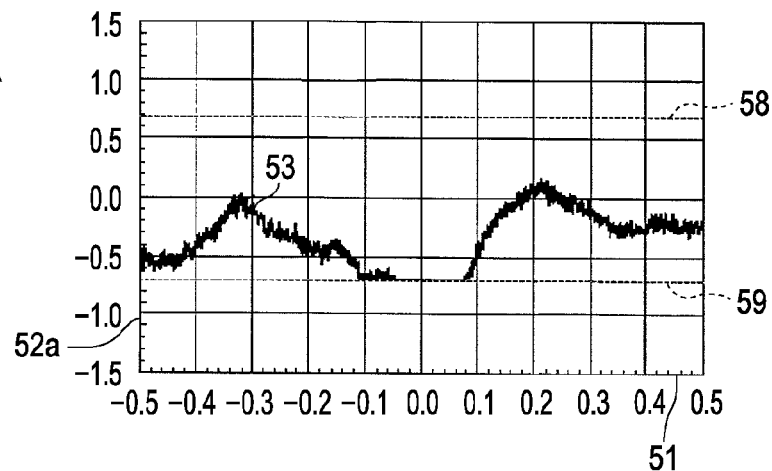
FIGS. 6A to 6C show waveforms for describing problems of a parallel shake correction target value, a rotation shake correction target value, and an integrated shake correction target value before the first exemplary embodiment of the present invention is executed.
Figure 6B:
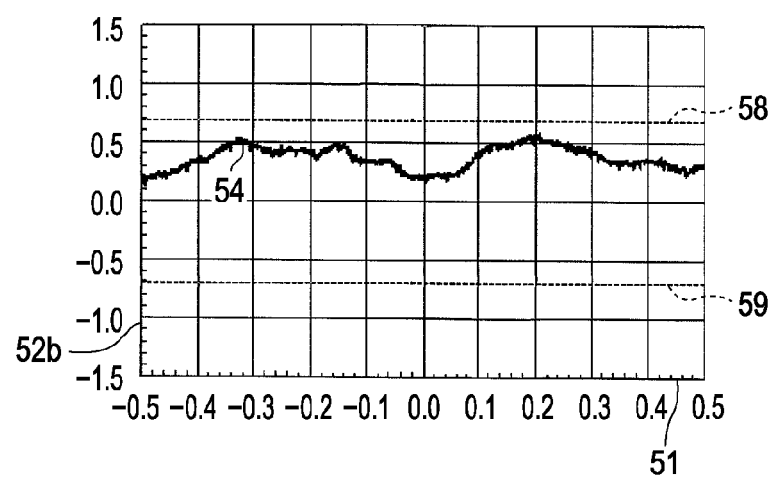
Figure 6C:
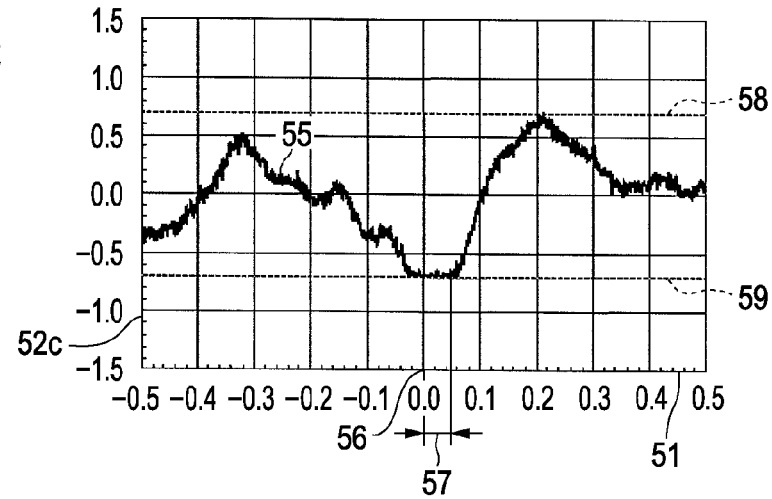
Figure 23A:
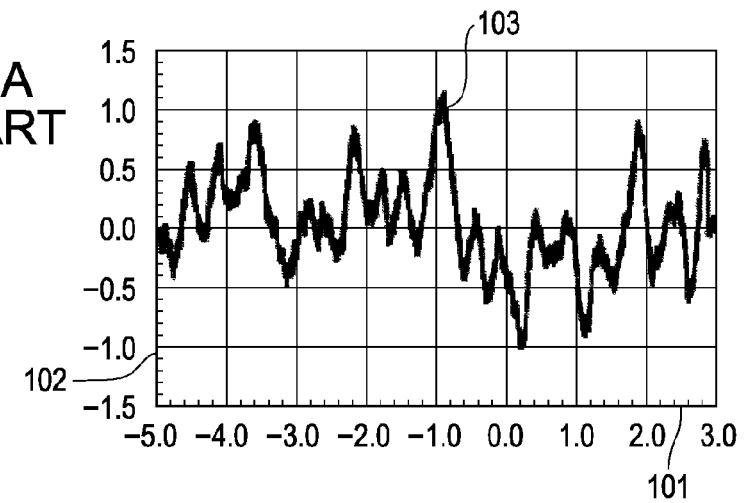
FIGS. 23A to 23C are waveform diagrams for describing problems of a camera of a conventional example, respectively.
Figure 23B:
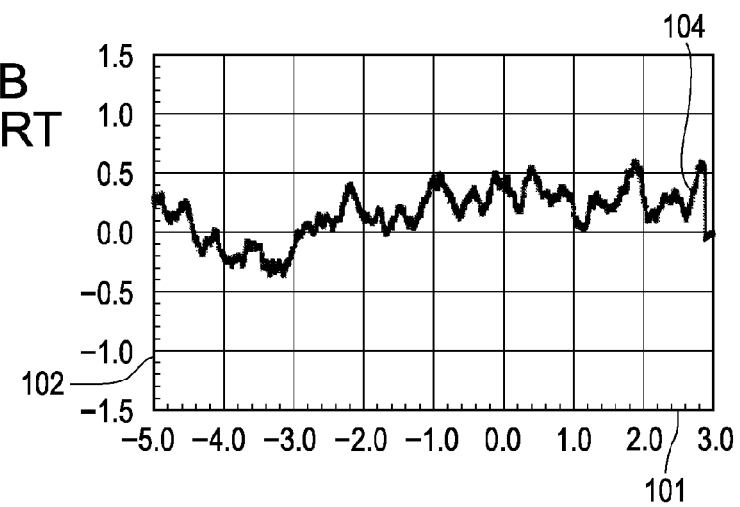
Figure 23C:
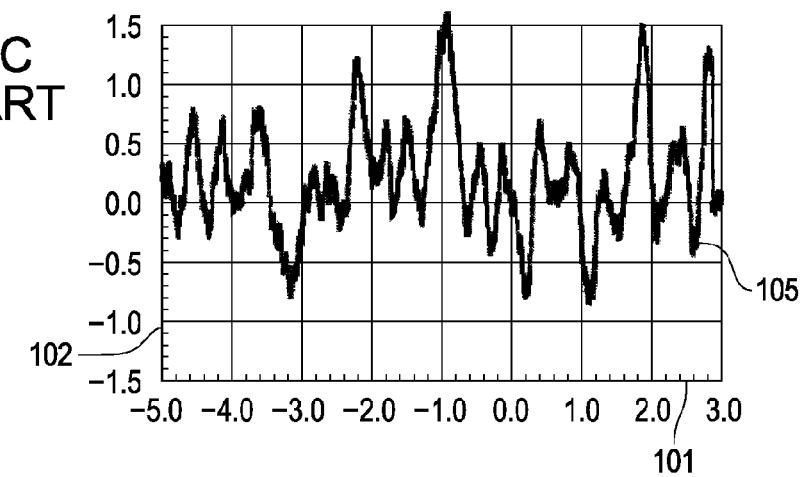

FIGS. 6A to 6C are explanatory diagrams for describing changes in drive target values of the shake correction unit 95 for correcting the image shake due to the input parallel shake and rotation shake. The hand-induced shake in the time axis 0±0.5 seconds in FIGS. 23A to 23C is magnified, and variation of the target value therefor is illustrated. The lateral axis 51 represents an elapsed time since the camera is held similarly to FIGS. 23A to 23C. The vertical axes 52 (52a to 52c) respectively represent a change in the target value. Broken lines 58 and 59 are both correction limit lines for the correction strokes of the shake correction unit 95. The shake correction unit 95 cannot be moved beyond this correction limit line. For this reason, the output of the shake correction target value beyond the limit range is also limited.

It is noted that in FIGS. 6A to 6C, the half press operation of the release member 93a for the image pickup preparations is already executed. For that reason, the shake correction target value in accordance with the shake is output. FIG. 6A illustrates a fluctuation in the parallel shake correction target value for correcting the parallel shake. The vertical axis 52a represents the parallel shake correction target value, and reference numeral 53 represents a waveform thereof. FIG. 6B illustrates a fluctuation in the rotation shake correction target value for correcting the rotation shake. The vertical axis 52b represents the rotation shake correction target value, and reference numeral 54 represents a waveform thereof. FIG. 6C illustrates a combined shake correction target value obtained through addition of the above-described values. The vertical axis 52c represents the combined shake correction target value, and reference numeral 55 represents a waveform thereof. Based on the waveform 55, the shake correction unit 95 is driven to suppress the image shake. Reference numeral 56 represents the time when an image pickup command is received (turning ON of the switch S2, corresponding to t=0). Reference numeral 57 represents an image pickup time period. In the present example, the period is set as about ⅟₁₅ second.

Here, as illustrated in FIG. 6A, it is understood that the waveform 53 of the parallel shake correction target value sometimes exceeds the correction limit 59. At such a time, the shake correction unit 95 uses up the correction stroke, and thus the image shake correction cannot be performed. Then, as the timing is overlapped with the image pickup period 57, a satisfactory image can not be obtained upon image pickup. In contrast, the rotation shake of FIG. 6B does not exceed the correction limit 58 or 59, and if the correction for the parallel shake is not performed, sufficient image shake correction should be performed. However, in actuality, as illustrated in FIG. 6C, at the time of the image pickup, the shake correction limit 59 is already exceeded, and even the correction for the rotation shake cannot be performed.

Similarly to the conventional camera, if only the correction for the rotation shake is performed, the above-described problem is not encountered. However, when the parallel shake is also corrected by the same shake correction unit 95, due to the large parallel shake, the shake correction unit 95 exceeds the correction limit, and even the rotation shake cannot be corrected.

Figure 7A:
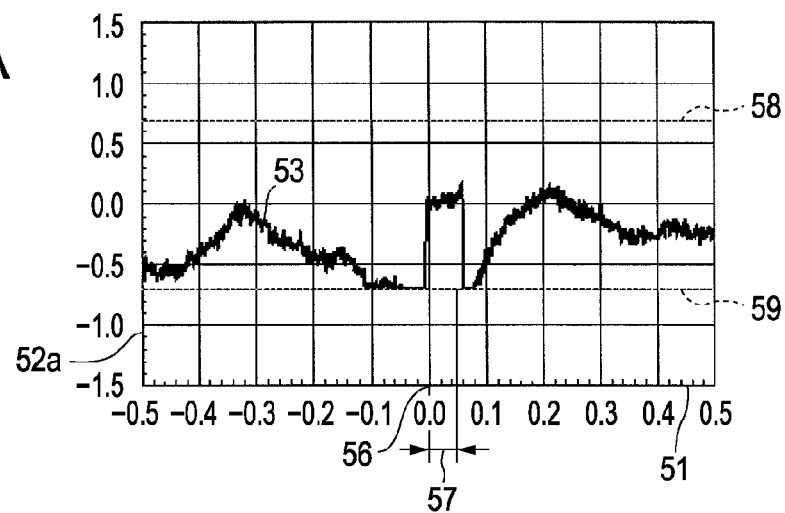
FIGS. 7A to 7C illustrate waveform examples of the parallel shake correction target value, the rotation shake correction target value, and the integrated shake correction target value according to the first exemplary embodiment of the present invention.
Figure 7B:
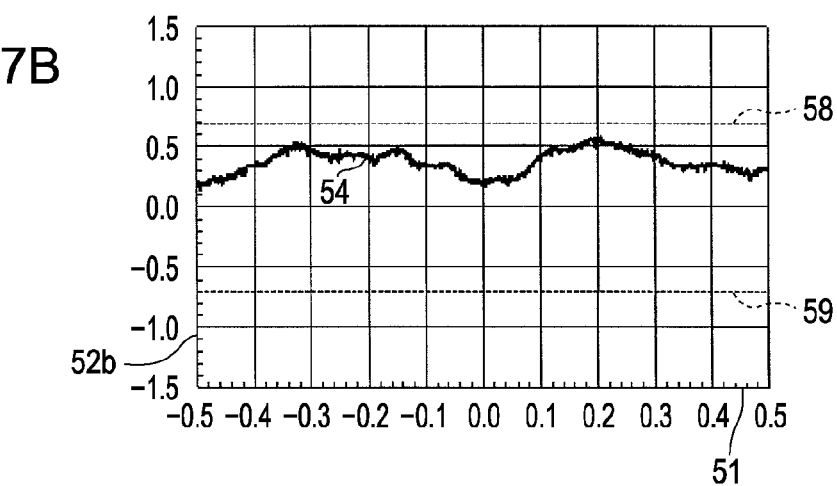
Figure 7C:
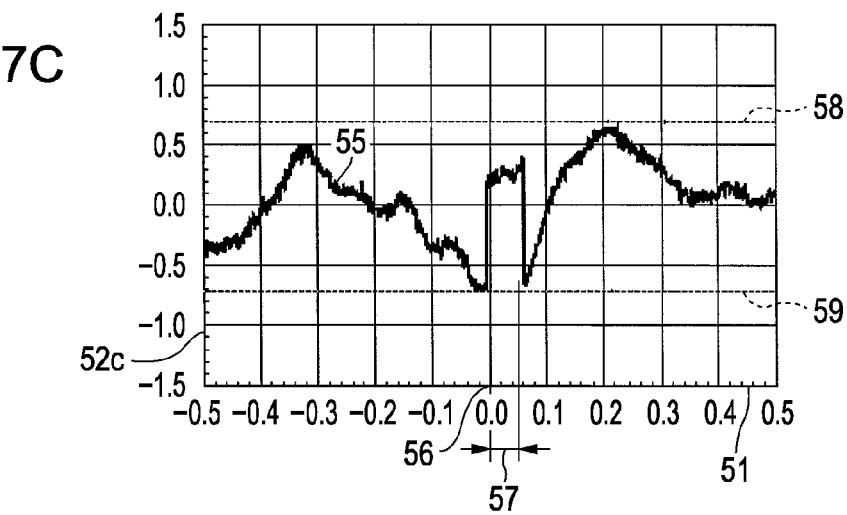

FIGS. 7A to 7C are explanatory diagrams for describing a detail of the parallel shake correction target value initialization described in Step #1013 of FIG. 5 for solving the above-described problems. Same components as those in FIGS. 6A to 6C are allocated with the same reference numerals. Herein, a difference from FIG. 6A resides in that when the waveform 53 of the parallel shake correction target value is at the time t=0 (at the time of the image pickup start (turning ON of the switch S2)), the output is initialized to be set as 0 (i.e. brought back or reset to zero), and after this, outputs are continuously varied again as before to correct for further shake after t=0.

Here, the initialization of the above-described parallel shake correction target value will be described. The parallel shake correction target value at the time of the full press operation of the release member 93a (turning ON of the switch S2) is set as V0. The parallel shake correction target value initialization unit 35p stores this value as $V0. The parallel shake correction target values afterwards V1, V2, V3 . . . Vn are converted into an initialized parallel shake correction target value Vex at the time of the image pickup through the following expression.

$Vexn = Vn - \$V0$

In this manner, when a certain value $V0 functioning as a bias offset is added to the parallel shake correction target value, at the time of the turning ON of the switch S2, the value becomes 0 in the following expression and successive outputs afterwards have the same value subtracted.

$Vex0 = V0 - \$V0$

Regarding the rotation shake of FIG. 7B, the rotation shake correction target value similar to FIG. 6B is used. However, FIG. 7C illustrates the total value of the parallel shake correction target value and the rotation shake correction target value. The combined shake correction target value that is actually a drive target value of the shake correction unit 95 does not reach the correction limit in the image pickup period 57. In this way, as the shake correction unit 95 does not reach a photographing limit in the image pickup period, it is possible to perform appropriate image shake correction.

It is noted that in Step #1012 of FIG. 5, only in a case where the photographing magnification ratio is equal to or larger than the predetermined value, in Step #1013, is the parallel shake correction target value initialized (set as 0 at the time of the image pickup start). This is because the parallel shake amount of a waveform 103 in FIGS. 23A to 23C is extremely small when the photographing magnification ratio is small (when an image pickup condition where the object distance is close is not applied mainly such as macro photography). Therefore, the shake correction unit 95 for the parallel shake correction does not often exceed the correction range.

In this manner, the reason why the parallel shake correction target value is not initialized in synchronism with the image pickup start when the object distance is far away is as follows. When the parallel shake correction target value is set as 0 to perform the initialization operation, the shake correction unit 95 performs an abrupt displacement in response to the operation. After that, it takes some time for the shake correction unit 95 to be stabilized. The parallel shake correction target value is not initialized unnecessarily for a purpose of suppressing the delay of the release time lag for that reason.

As is understood from FIG. 7A, after the end of the image pickup period 57 (i.e. after ⅟₁₅ second), the parallel shake correction target value waveform 53 is returned to the waveform before the image pickup (before the initialization) again (Step #1015 of FIG. 5). At the time of the image pickup, the parallel shake correction target value is initialized. As described above, at the time of the image pickup start, the bias offset value $V0 is subtracted from the parallel shake correction target value so that the value becomes 0. For that reason, the parallel shake correction target value is within the shake correction limit during a short period of time after the initialization. However, on the other hand, after the elapsed of the above-described period, the correction limit is exceeded at many times (because the parallel shake correction target value becomes asymmetrical with respect to the center).

In view of the above, in synchronism with the completion of image pickup, the bias offset value $V0 is removed. When the parallel shake correction target value is set as V15 after ⅟₁₅ second, the initialized parallel shake correction target value is found out through the following expression, but Vex15 is not used for outputs afterwards and V16 is set again.

$Vex15 = V15 - \$V0$

It is noted that herein, at the time of the image pickup start, the parallel shake correction target value waveform 53 need not be returned all the way to 0, but could be shifted towards 0. This is because the image pickup period is sufficiently short as compared with the composition checking period (a period from the focused state to the image pickup in FIG. 6A) in general, and it suffices that the parallel shake correction target value does not exceed the correction limit during the period. Hereinafter, a modified example of the above-described embodiment will be described.

In general, if about 10% of the correction stroke is left, the shake correction unit 95 does not use up the correction stroke during the image pickup period 57. Therefore, at the time of the image pickup start, if the parallel shake correction target value waveform 53 is reduced to be within 90% of the correction entire stroke, there are no bad influences on the image pickup in most cases. Accordingly, the movement of the image on the image pickup device, or fluctuation of the composition at the time of the image pickup, can be decreased. That is, at the time of the image pickup start, in a case where the parallel shake correction target value is within 90% of the entire correction stroke, the correction target value is directly used. Only in a case where the shake is the parallel shake correction target value is greater than 90% of the maximum stroke, the correction stroke may be limited so that the parallel shake correction target value is within 90% of the correction stroke. It is noted that the center of the shake correction range or the predetermined range within 90% can be selectively set as the initialization range.

Figure 8A:
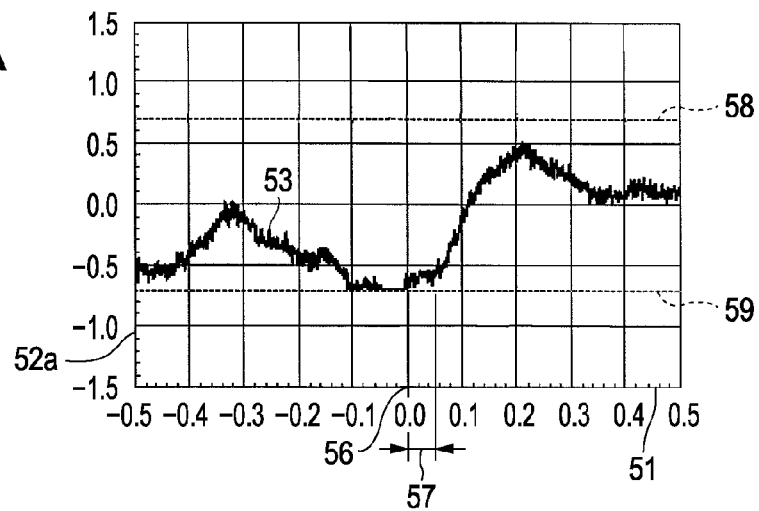
FIGS. 8A to 8C illustrate other waveform examples of the parallel shake correction target value, the rotation shake correction target value, and the integrated shake correction target value according to the first exemplary embodiment of the present invention.
Figure 8B:
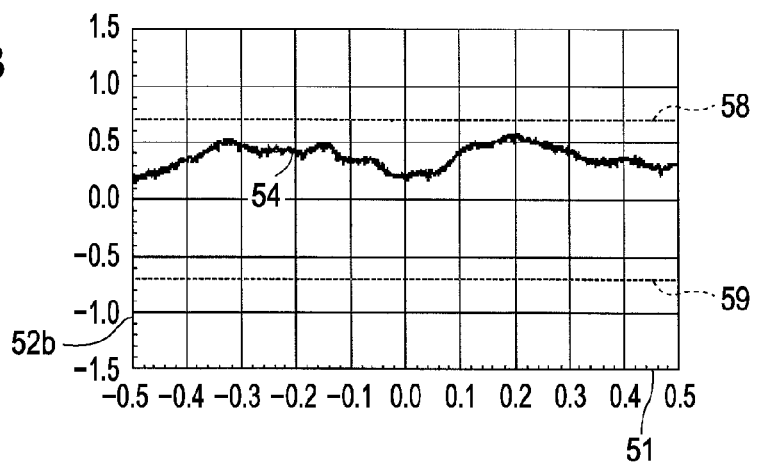
Figure 8C:
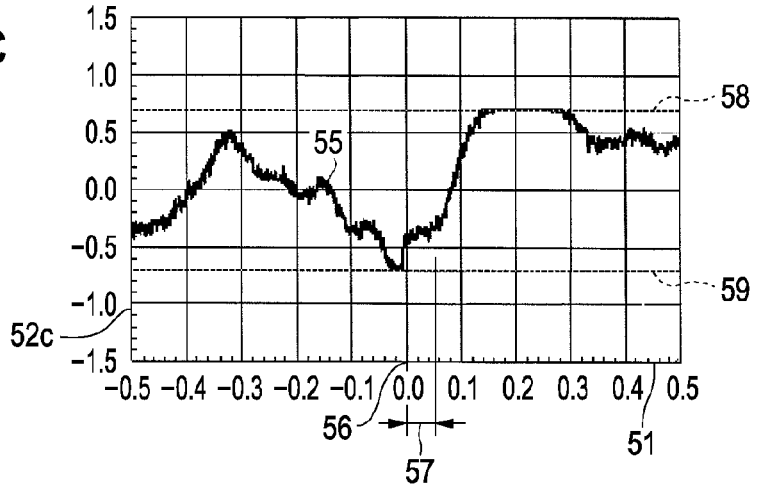

FIGS. 8A to 8C illustrate waveforms for explaining the above-described configurations. The same components as those in FIGS. 6A to 6C and FIGS. 7A to 7C are allocated with the same reference numerals. The parallel shake correction target value (the waveform 53) of FIG. 8A is initialized to a value at which about 10% is left before the correction limit 59 at the image pickup start time point 56. Now, when the correction limit value is set as Vlim, the initialized parallel shake correction target value Vex0 of the image pickup start time point 56 is found out through the following expression.

$$Vex0=V0-\$V0\pm 0.9\times Vlim$$

Here, a reason why ± is used is that when the parallel shake correction target value V0 at the time of the image pickup start is close to the correction limit 59 on the minus side as in FIG. 6A, the following expression is established.

$$Vex0=V0-\$V0-0.9\times Vlim$$

On the other hand, when the parallel shake correction target value V0 at the time of the image pickup start is close to the correction limit 58 on the plus side as in FIG. 6A, the following expression is established.

$$Vex0=V0-\$V0+0.9\times Vlim$$

For this reason, during the image pickup period 57, the shake correction limit is not exceeded.

It is noted that the bias offset amount for the initialization ($V0) is small and the influence thereof is small, and therefore cancellation of the initialization (removal of the bias offset) is not performed after the image pickup. For that reason, a time saving can be realized as the operation is not performed, thus achieving a high speed system.

Figure 9:
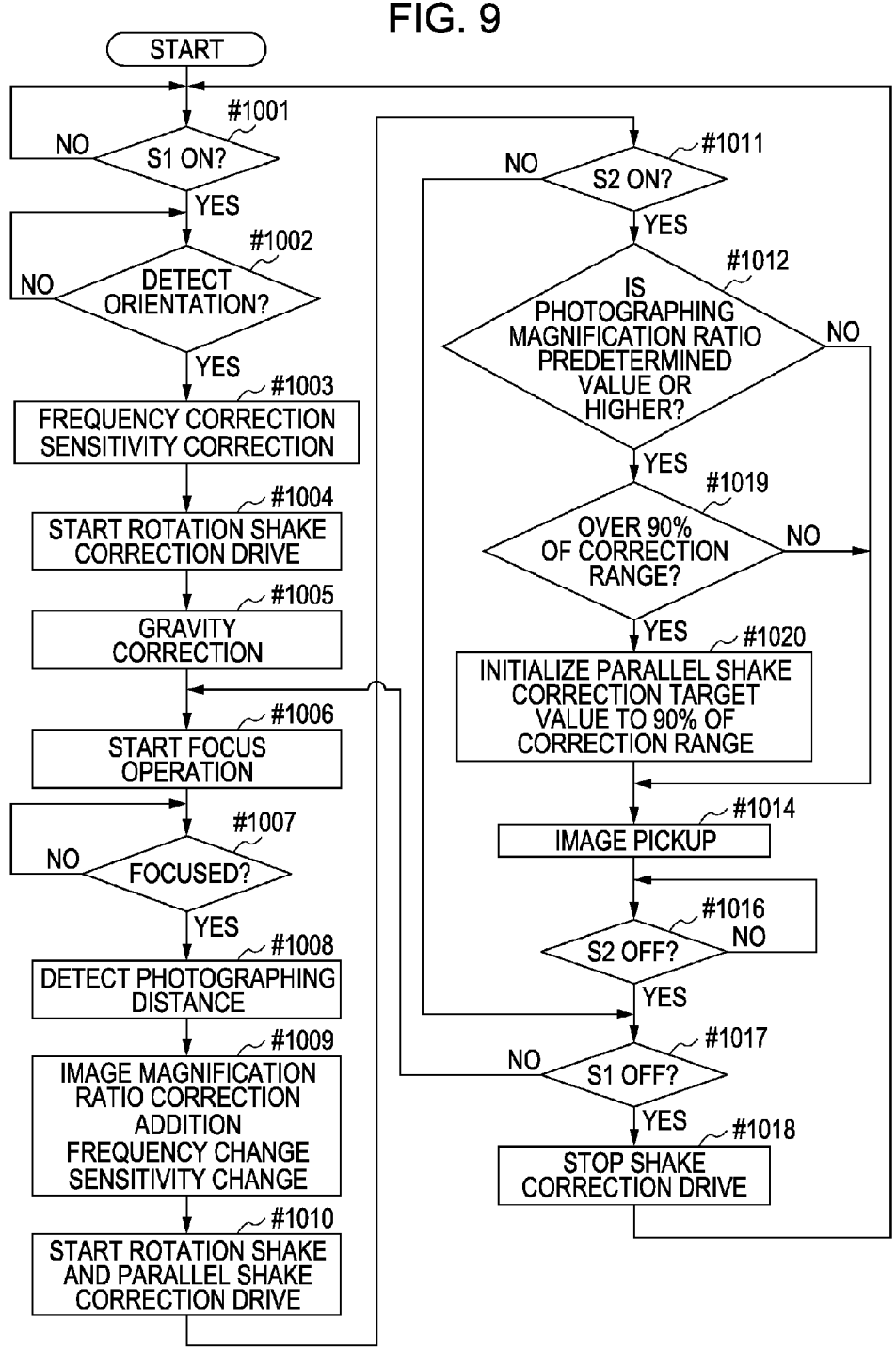
FIG. 9 is a flowchart illustrating operations for realizing the waveforms of FIGS. 8A to 8C.

FIG. 9 is a flowchart illustrating an example for describing the above-described operations, and is basically similar to the flowchart of FIG. 5. For that reason, the parts for performing the same operations are indicated by the same step numbers and a description thereof will be omitted. According to the flowchart of FIG. 9, Steps #1013 and #1015 in the flowchart of FIG. 5 are omitted, and instead, Steps #1019 and #1020 are provided.

In Step #1011 of FIG. 9, the instruction of the image pickup start (turning ON of the switch S2) is performed. Next in Step #1012, when it is determined that the object distance is close (i.e. the photographing magnification ratio is large), the flow is advanced to Step #1019. Then, in this Step #1019, it is determined whether the parallel shake correction target value at this moment is within 90% of the shake correction limit range. When the parallel shake correction target value is within 90%, it is unnecessary to initialize the parallel shake correction target value, and the flow is advanced to the image pickup in Step #1014. On the other hand, when 90% of the shake correction limit range is exceeded or when the correction limit is exceeded, the flow is advanced to Step #1020.

In Step #1020, the initialization is performed so that the parallel shake correction target value is within 90% of the correction range (subtraction of the bias offset), and the integrated shake correction target value does not exceed the correction limit at the time of the image pickup. It is noted that the parallel shake correction target value is obtained in the acceleration integration unit (the parallel shake computation unit) 22p in FIG. 2. However, in actuality, the target value for driving the shake correction unit 95 causes the gain of the parallel shake correction target value to be changed by the image magnification ratio correction unit 25p, the frequency characteristic change unit 15p, and the sensitivity change unit 16p. The "90% of the correction range" described herein is a value obtained by subjecting the parallel shake correction target value to the image magnification ratio correction unit 25p, the frequency characteristic change unit 15p, and the sensitivity change unit 16p. The parallel shake correction target value initialization unit 35p adjusts the bias offset to the parallel shake correction target value in view of all these gain corrections.

According to the above-described first exemplary embodiment, attention is paid to the fact that the parallel shake amount is large during the composition checking period and the parallel shake amount during the short period of the image pickup is small at the time of the image pickup, and the shake correction unit 95 is located at a position in the stroke at which the parallel shake correction can be performed.

To be more specific, the following configuration is adopted. The rotation shake detection unit 96p arranged to detect the rotation shake about the image pickup optical axis and the rotation shake computation unit 13p arranged to process the rotation shake detection signal into the rotation shake correction target value are provided. Furthermore, the parallel shake detection unit 11p arranged to detect the parallel shake in the plane surface perpendicular to the image pickup optical axis and the parallel shake computation unit 22p adapted to process the parallel shake detection signal into the parallel shake correction target value are provided. Furthermore, the shake correction unit 95 adapted to correct the image shake generated on the image plane of the camera due to the rotation shake and the parallel shake based on the rotation shake correction target value and the parallel shake correction target value initialization unit 35p adapted to initialize only the parallel shake correction target value and the parallel shake correction target value are provided. Then, by initializing the parallel shake correction target value at the start of image pickup using the parallel shake correction target value initialization unit 35, the position of the shake correction unit 95 at the time of the image pickup start is set within the initialization range set within the shake correction range (within 90% of the complete stroke).

Also, the following configuration is adopted. The photographing distance detection unit 19 arranged to detect a distance from the camera to the photograph object that is the target and the photographing distance corresponding unit 36p arranged to control the parallel shake correction target value initialization unit 35p based on the object distance detection signal are further provided. When the object distance is smaller than the set threshold value, the parallel shake correction target value initialization unit 35p is activated, and at the time of the image pickup start, the shake correction unit 95 is located within the initialization range of the shake correction range.

With the above-described configuration, it is possible to realize a small sized camera which can be developed into a consumer product. In other words, it is possible to provide a camera in which parallel shake in the plane perpendicular to the image pickup optical axis can be corrected with high accuracy while the small size and the light weight of the camera are maintained.

Second Exemplary Embodiment

According to the above-described first exemplary embodiment, at the time of the image pickup, only the parallel shake correction target value is initialized when the object distance is close (or, when the photographing magnification ratio is large). However, a case is not limited to such an example. At the time of the image pickup, both the parallel shake correction target value and the rotation shake correction target value may be initialized when the object distance is close (or, when the photographing magnification ratio is large). With this configuration, at the time of the image pickup, a possibility that the shake correction unit 95 uses up the correction stroke can be set significantly low.

Figure 10A:
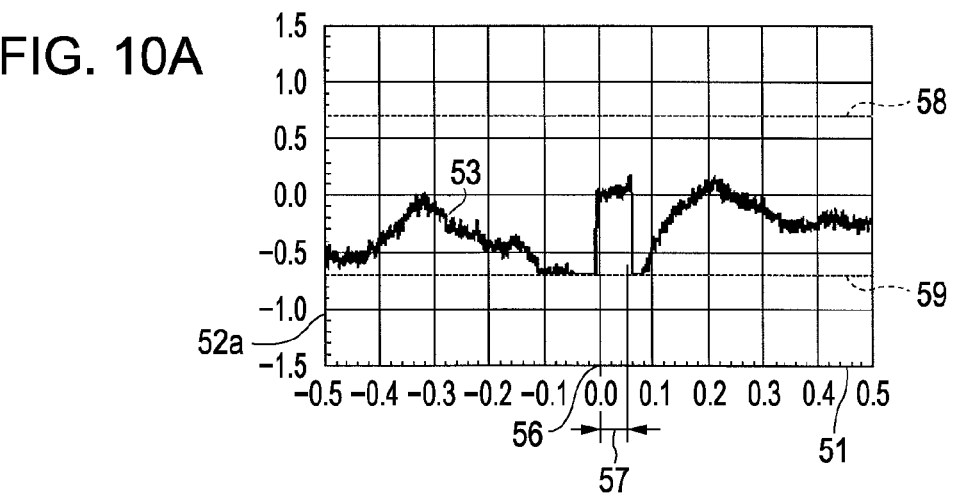
FIGS. 10A to 10C illustrate waveform examples of the parallel shake correction target value, the rotation shake correction target value, and the integrated shake correction target value according to a second exemplary embodiment of the present invention.
Figure 10B:
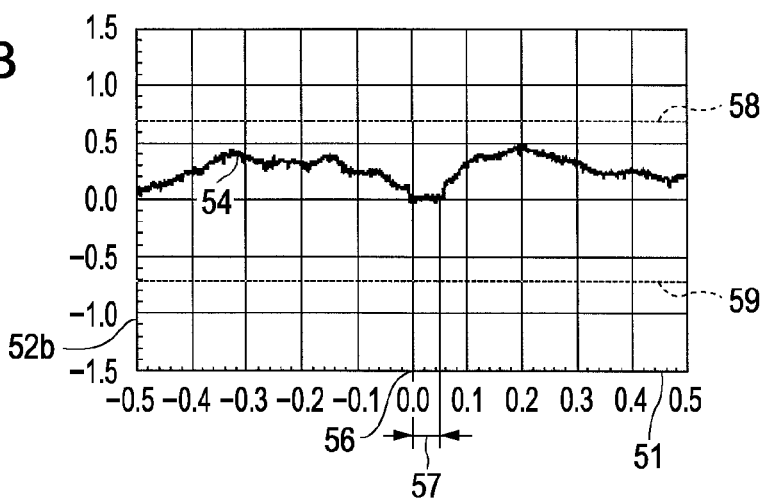
Figure 10C:
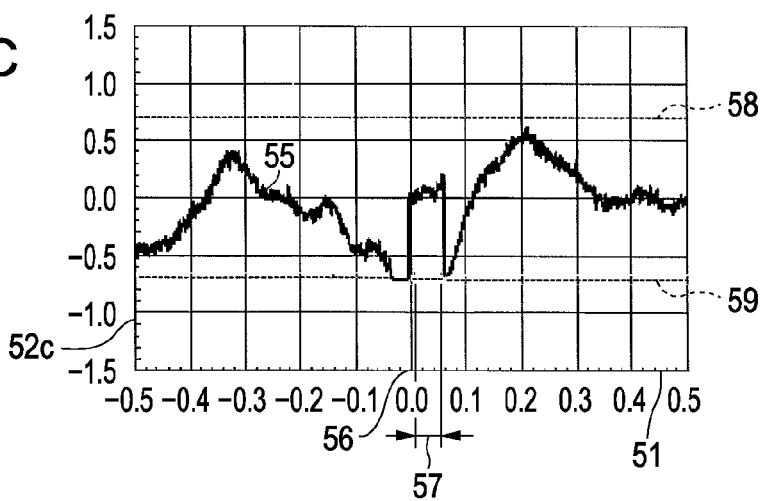

FIGS. 10A to 10C are diagrams for describing the above configuration. The same parts as those in FIGS. 6A to 6C to FIGS. 8A to 8C are allocated with the same reference numerals and a description thereof will be omitted. The waveform 53 of the parallel shake correction target value in FIG. 10A is the same as that in FIG. 7A. However, according to a second exemplary embodiment, the waveform 54 of the rotation shake correction target value in FIG. 10B is also initialized at the image pickup start time point 56, and the initialization is cancelled at the end of the image pickup.

In this manner, at the image pickup start time point 56, both the parallel shake correction target value and the rotation shake correction target value become 0, and outputs continue from that point. Thus, the integrated shake correction target value of FIG. 10C is also set to 0 at the time of the image pickup start. That is, the shake correction unit 95 starts the image shake correction from 0 (optical axis center position) at the time of the image pickup start, and therefore during image pickup, the shake correction unit 95 does not exceed the correction limit range.

Figure 11:
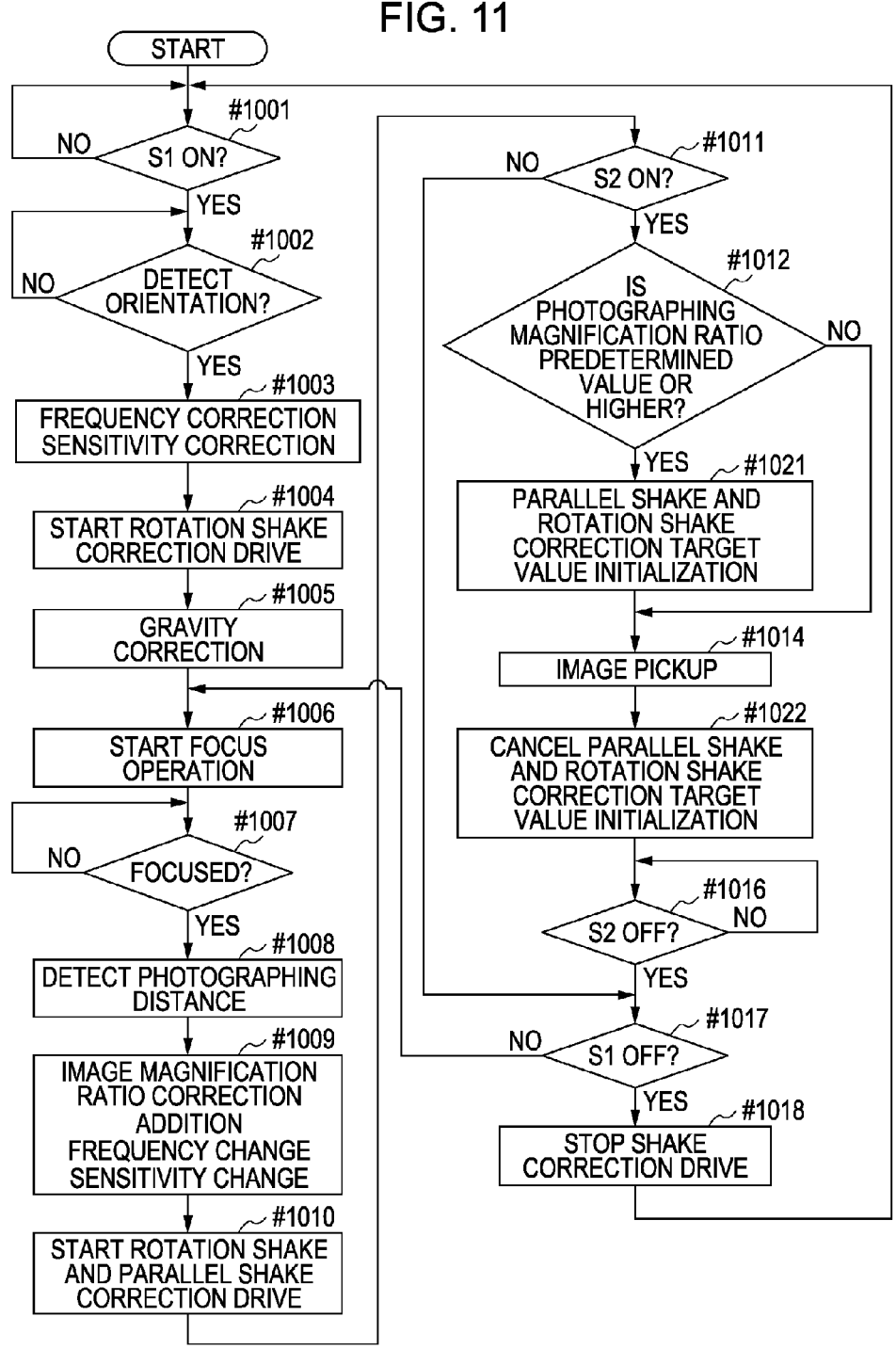
FIG. 11 is a flowchart illustrating operations of a main part of the camera according to the second exemplary embodiment of the present invention.

FIG. 11 is a flowchart for describing the above-described operations. In principle, the flowchart is similar to the flowchart of FIG. 5. For that reason, the parts performing the same operations are allocated with the same step numbers, and a description thereof will be omitted.

FIG. 11 is different from FIG. 5 in that instead of Steps #1013 and #1015, Steps #1021 and #1022 are provided.

In Step #1021 of FIG. 11, the parallel shake correction target value and also the rotation shake correction target value are initialized (reset to zero). At the time of the image pickup start, respective appropriate bias offsets are added so that the target value becomes 0. Also, in Step #1022, the addition of the bias offsets is stopped and the initialization ends.

It is noted that herein, at the time of the image pickup start, the parallel shake correction target value waveform 53 and the rotation shake correction target value waveform 54 are reduced to 0, but as an alternative they may not necessarily be reduced all the way to 0. This is because the image pickup period is sufficiently short as compared with the composition checking period (in FIG. 6A, the period from the focused state to the image pickup period), and during the period, it suffices that the integrated shake correction target value does not exceed the correction limit. Hereinafter, a modified example of the above-described embodiment will be described.

In general, if about 10% of the correction stroke is left, the image pickup period does not use up the whole correction stroke. Therefore, at the time of the image pickup start, if the parallel shake correction target value waveform 53 and the rotation shake correction target value waveform 54 are reduced to be less than 90% of the correction entire stroke, there are no influences on the image pickup in mane cases. Accordingly, the fluctuation of the composition at the time of the image pickup can be decreased. That is, at the time of the image pickup start, in a case where the parallel shake correction target value and the rotation shake correction target value are below 90% of the entire correction stroke, the correction target value is used as it is. Only in a case where the shake exceeds this threshold value, the correction stroke is limited so that the parallel shake correction target value and the rotation shake correction target value are reduced to be less than 90% of the maximum available correction stroke.

Figure 12A:
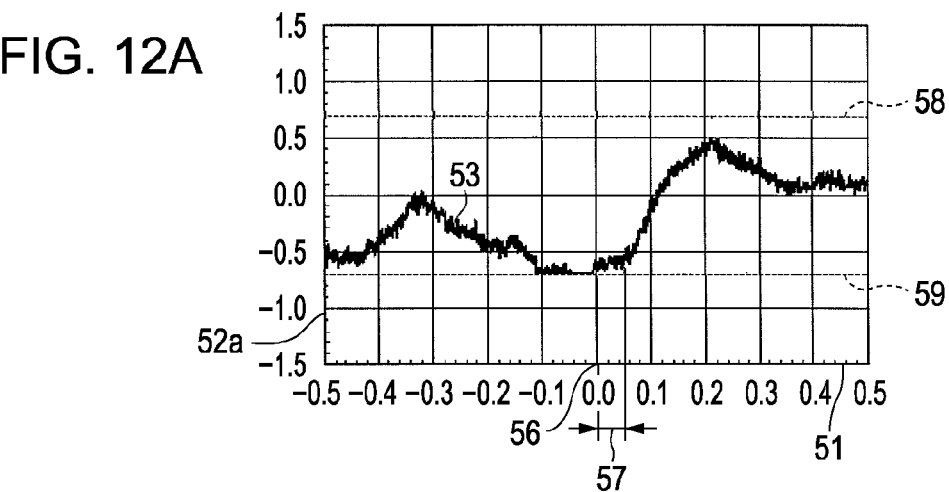
FIGS. 12A to 12C illustrate other waveform examples of the parallel shake correction target value, the rotation shake correction target value, and the integrated shake correction target value, according to the second exemplary embodiment of the present invention.
Figure 12B:
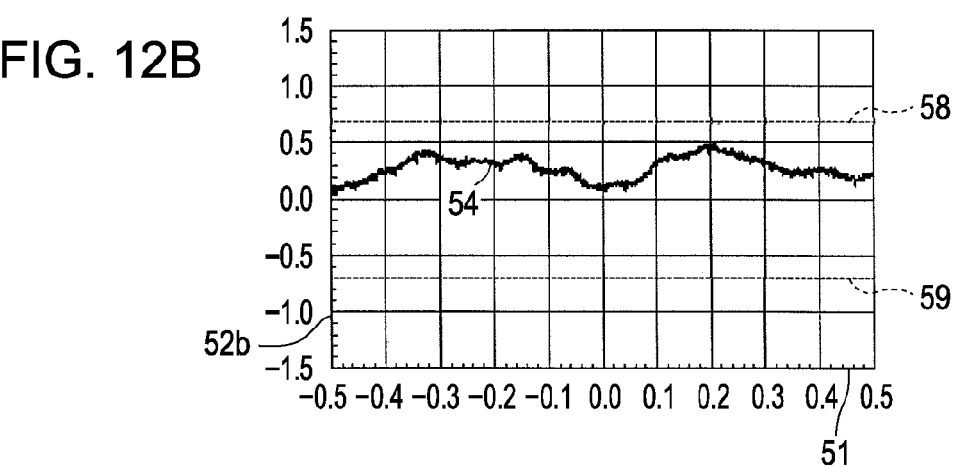
Figure 12C:
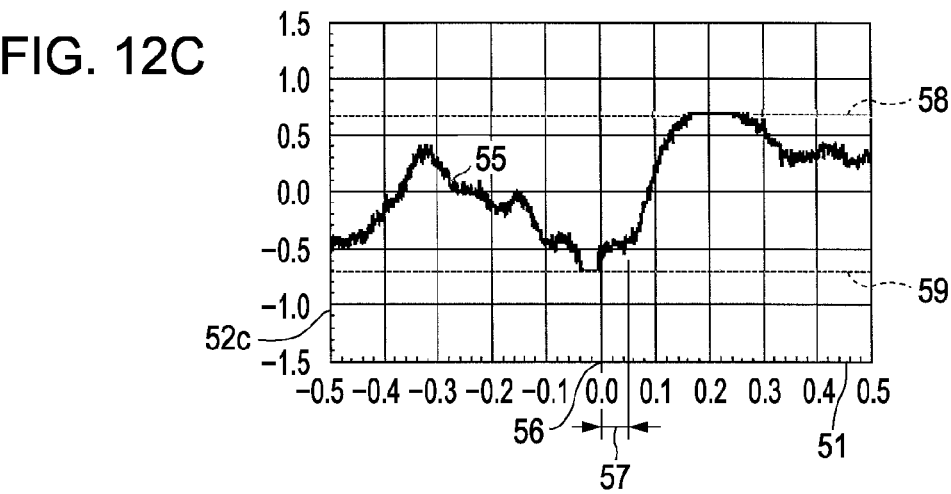

FIGS. 12A to 12C illustrate waveforms for explaining the above-described configurations and the same parts as those in FIGS. 8A to 8C are allocated with the same reference numerals. The waveform 53 of the parallel shake correction target value in FIG. 12A is initialized to a value at which about 10% of the correction limit 59 is left at the image pickup start time point 56. For that reason, during the image pickup period 57, the shake correction limit is not exceeded.

Similarly, the waveform 54 of the rotation shake correction target value in FIG. 12B is also initialized to a value at which about 10% of the correction limit 59 is left at the image pickup start time point 56. However, the rotation shake correction target value waveform 54 in this drawing is not originally in the vicinity of the correction limit (the value is almost 0 and does not exceed 90% of the correction stroke). For that reason, in the state of FIG. 12B, the rotation shake correction target value is not initialized (reset). Of course, in a case where the rotation shake correction target value at the image pickup start time 56 exceeds 90% of the correction stroke, the initialization operation on the value (initialized to a value at which about 10% of the correction limit is left) is performed.

Both the parallel shake correction target value and the rotation shake correction target value are located within 90% of the correction stroke at the time of the image pickup. Thus, the integrated shake correction target value waveform 55 of FIG. 12C does not exceed the correction limit at the time of the image pickup and satisfactory shake correction is performed during the image pickup period.

Figure 13:
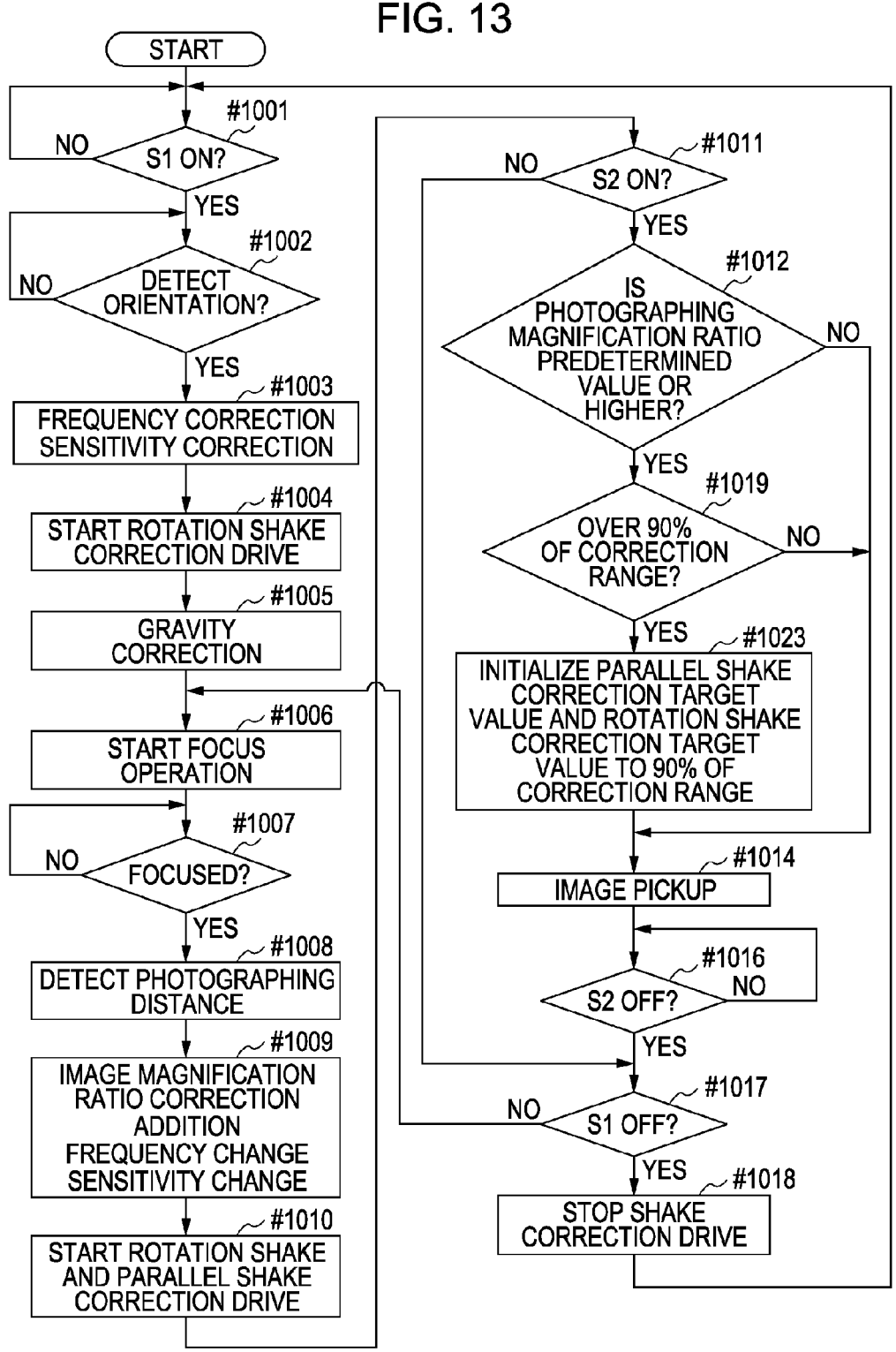
FIG. 13 is a flowchart illustrating operations for realizing the waveforms of FIGS. 12A to 12C.

FIG. 13 is a flowchart showing the above-described operations and is basically similar to the flowchart of FIG. 9. For that reason, the parts performing the same operations are allocated with the same step numbers, and a description thereof will be omitted.

FIG. 13 is different from FIG. 9 in that Step #1023 is provided instead of Step #1020.

In Step #1011 of FIG. 13, the instruction of the image pickup start (turning ON of the switch S2) is performed. In Step #1012, when it is determined that the object distance is close (the photographing magnification ratio is large), the flow is advanced to Step #1019. Then, in Step #1019, it is determined whether the integrated shake correction target value at this moment is within 90% of the shake correction limit range. As a result, when the integrated shake correction target value is within 90%, it is unnecessary to initialize the parallel shake correction target value and the rotation shake correction target value, the flow is advanced to the image pickup in Step #1014. Thus, when 90% of the correction range is exceeded or already the correction limit is exceeded, the flow is advanced to Step #1023.

In Step #1023, both the parallel shake correction target value and the rotation shake correction target value are initialized to be set within 90% of the correction range (the bias offset is added) so that at the time of the image pickup the integrated shake correction target value does not exceed the correction limit.

Here, in a case where the parallel shake correction target value and the rotation shake correction target value at the respective image pickup time points do not exceed the entire stroke (i.e. the correction limit), the initialization operation is not performed on the target values. In other words, in a case where the rotation shake correction target value in FIG. 12B is almost 0 at the time of the image pickup start, the initialization operation is not performed.

In this manner, instead of setting the parallel shake correction target value and the rotation shake correction target value within 90% of the respective entire strokes, initializing the integrated shake correction target value may be performed instead.

Figure 14:
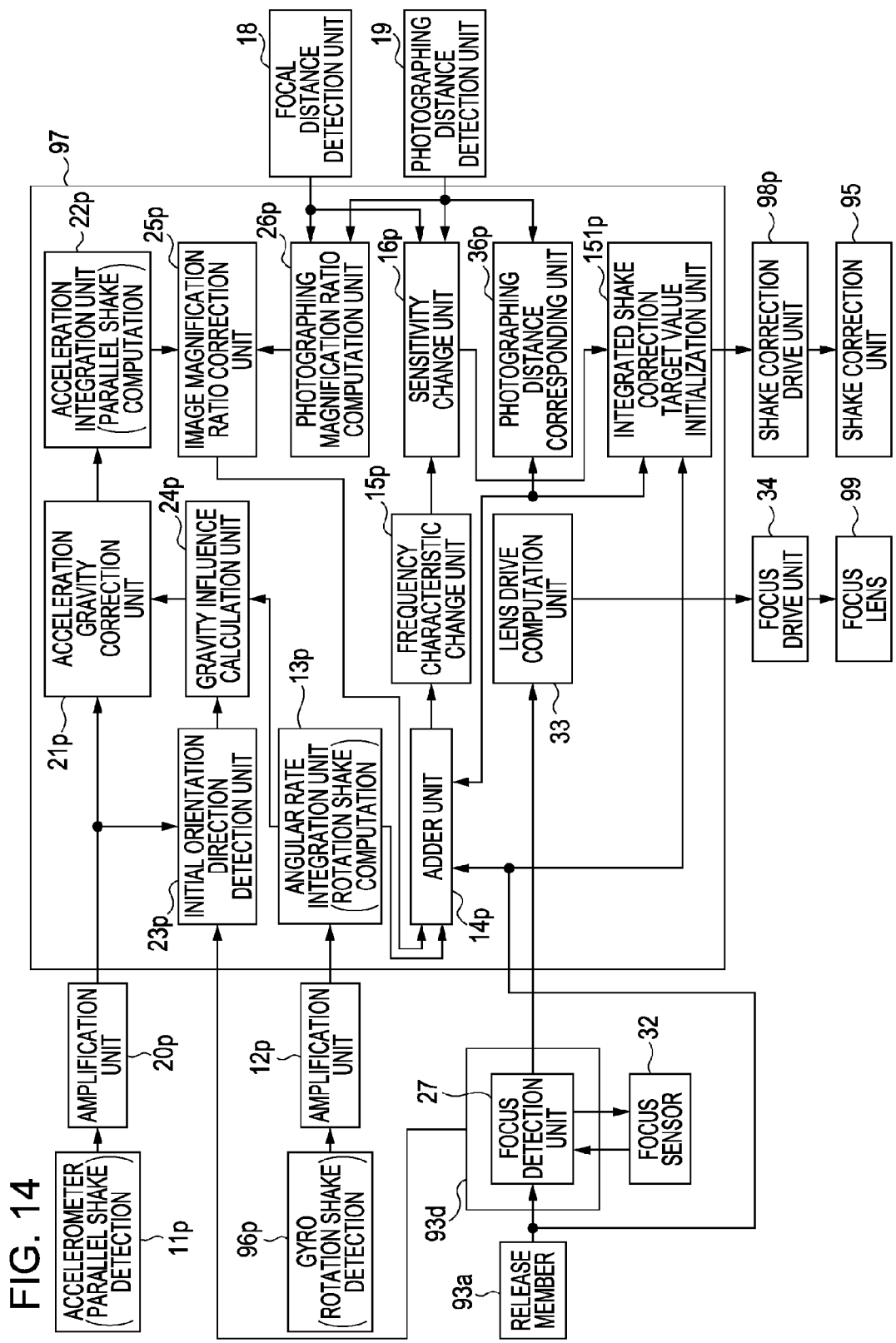
FIG. 14 is a block diagram of another circuit configuration example of a camera according to the second exemplary embodiment of the present invention.

FIG. 14 is a block diagram of a circuit configuration example for realizing the above-described structure, and the same parts as those in FIG. 2 are allocated with the same reference numerals. Here, instead of the parallel shake correction target value initialization unit 35p provided in FIG. 2, in FIG. 14, an integrated shake correction target value initialization unit 151p is provided. Then, the integrated shake correction target value output from the sensitivity change unit 16p is input. An output of the integrated shake correction target value initialization unit 151p is sent to the shake correction drive unit 98p.

Signals from the switch S2 and the photographing distance corresponding unit 36p in accordance with the full press operation of the release member 93a are input to the integrated shake correction target value initialization unit 151p. The ON signal of the switch S2 is input, and also, when the photographing distance is closer than a threshold value set by the photographing distance corresponding unit 36p and the photographing magnification ratio is large, it is detected whether the integrated shake correction target value at that time point is below 90% of the entire correction stroke. When 90% is exceeded, the initialization (resetting) is performed so that the integrated shake correction target value is less than 90% of the maximum stroke.

Figure 15:
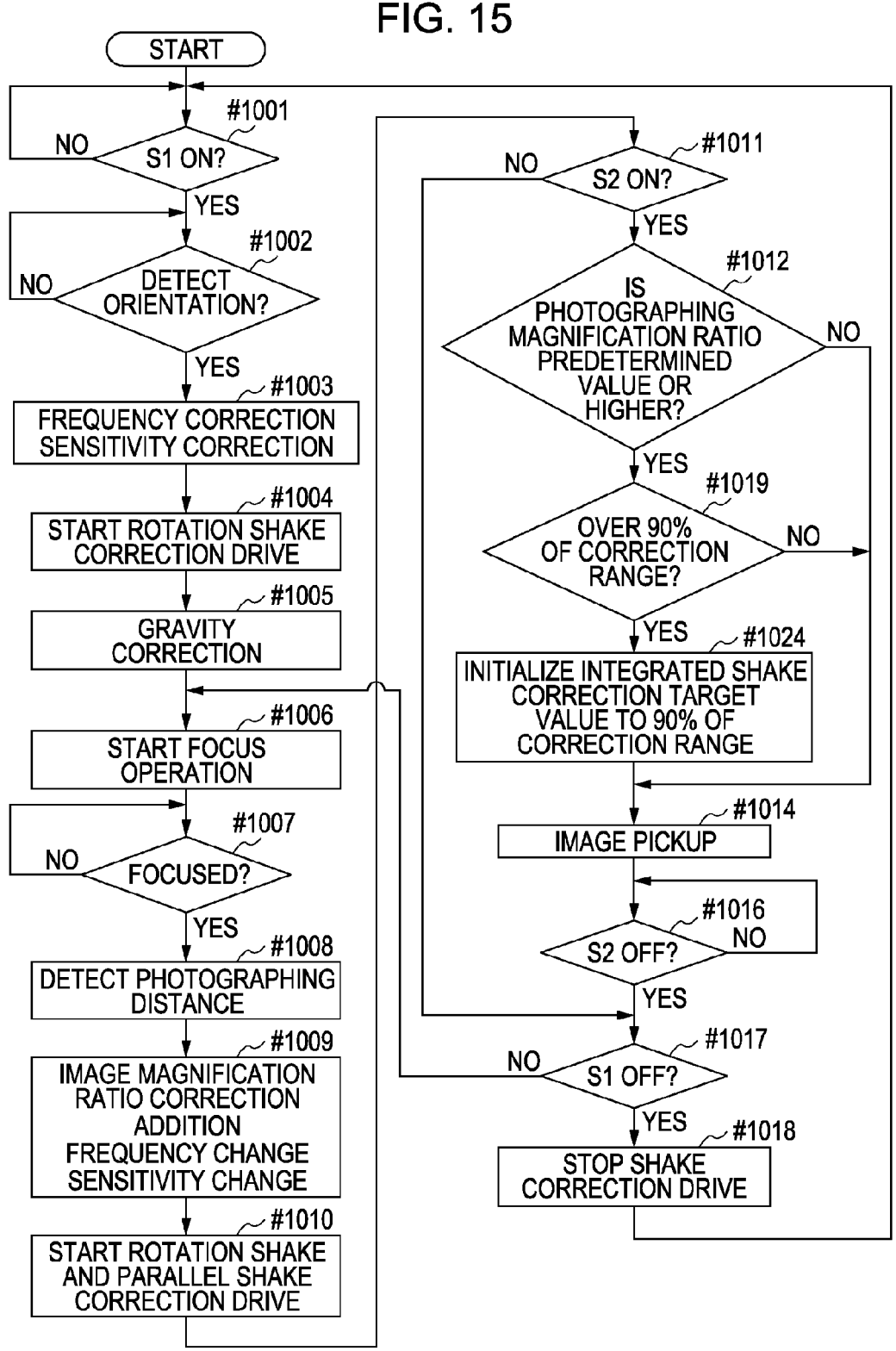
FIG. 15 is a flowchart illustrating operations in a case of adopting the circuit configuration of FIG. 14.

FIG. 15 is a flowchart for describing the above-described operations. FIG. 15 is different from FIG. 13 in that instead of Step #1023, Step #1024 is provided.

In Step #1011 in FIG. 15, the instruction of the image pickup start (turning ON of the switch S2) is performed. In Step #1012, when it is determined that the object distance is close (the photographing magnification ratio is large), the flow is advanced to Step #1019. Then, in Step #1019, it is determined whether the integrated shake correction target value at the current time point is below 90% of the shake correction limit range. As a result, when the integrated shake correction target value is below 90%, it is unnecessary to initialize the integrated shake correction target value. Thus, the flow is advanced to the image pickup in Step #1014, when 90% of the correction range is exceeded or already the correction limit is exceeded, the flow is advanced to Step #1024.

In Step #1024, the integrated shake correction target value is reset to be below 90% of the correction range (the bias offset is added) so that during image pickup the integrated shake correction target value does not exceed the correction limit.

According to the above-described second exemplary embodiment, attention is paid to the fact that only when the photographing distance is close, is it likely that resetting is required. When the photographing distance is close, at the time of the image pickup, the shake correction unit 95 is set to be located within 90% of the maximum correction stroke.

To be more specific, the units arranged to detect the shake (the rotation shake about the image pickup optical axis and the parallel shake in the plane surface perpendicular to the image pickup optical axis) (the accelerometer 11p and the angular accelerator 96p) are provided. Furthermore, the units arranged to detect the shake (the rotation shake about the image pickup optical axis and the parallel shake in the plane perpendicular to the image pickup optical axis) (the accelerometer 11p and the angular accelerator 96p) are provided. Furthermore, the units arranged to process the shake direction signals into the shake correction target values (the angular rate integration unit 13p, the sensitivity change unit 16p, and the acceleration integration unit 22p) are provided. Furthermore, the units arranged to initialize or reset the shake correction target values (the parallel shake correction target value initialization unit 35p, and the integrated shake correction target value initialization unit 151p) and the shake correction unit 95 arranged to correct the image shake based on the shake correction target value are provided. Furthermore, the photographing distance detection unit 19 arranged to detect the distance to the object and the photographing distance corresponding unit 36p arranged to operate the unit which initializes the shake correction target value based on the object distance detection signal are provided. Then, at the time of the image pickup start, by operating the photographing distance corresponding unit 36p to initialize (reset) the shake correction target value, at the time of the image pickup start, the shake correction unit 95 is set to be located at the initialization range which is set below 90% of the maximum shake correction range.

With the above-described configuration, it is possible to realize a small sized camera which can be developed into a consumer product. In other words, it is possible to provide a camera in which shake in the plane perpendicular to the image pickup optical axis can be corrected with high accuracy while the small size and the light weight of the camera are maintained.

Third Exemplary Embodiment

Figure 16:
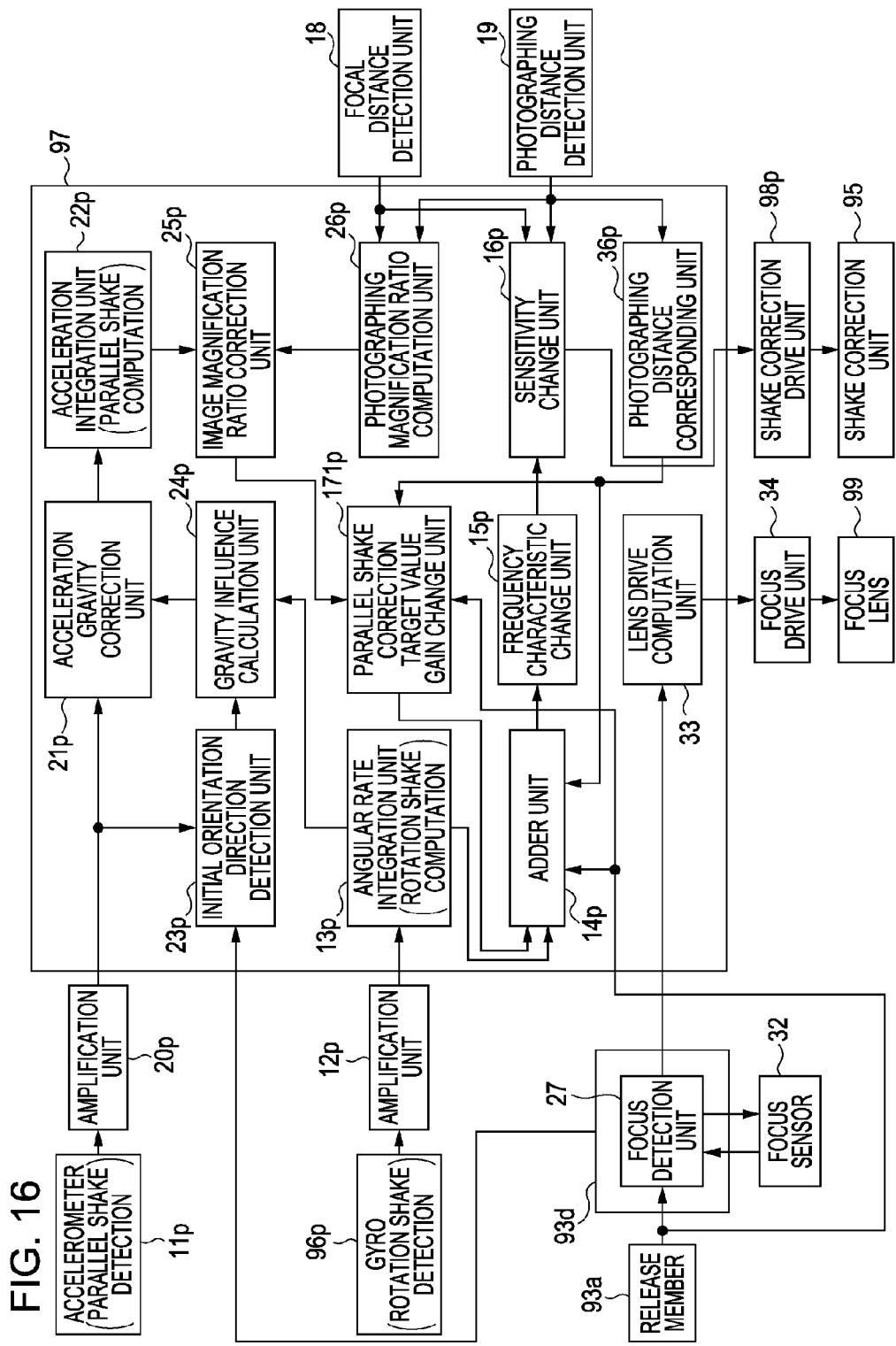
FIG. 16 is a block diagram of a circuit configuration example of the camera according to a third exemplary embodiment of the present invention.

FIG. 16 is a block diagram of a circuit configuration example of the camera according to a third exemplary embodiment of the present invention. FIG. 16 is different from the block diagram of FIG. 2 in that instead of the parallel shake correction target value initialization unit 35p, a parallel shake correction target value gain change unit 171p is provided.

The signal response to the full press operation of the release member 93a (the ON signal of the switch S2) and the signal of the photographing distance corresponding unit 36p are input to the parallel shake correction target value gain change unit 171p. When the photographing distance is close (for example, 1:1 magnification photography) and also before the image pickup start (the period from the half press of the release member 93a to the full press), the gain of the parallel shake correction target value is set to half the value of the gain at the time of the image pickup. For that reason, the parallel shake correction target value is not set to be large before the image pickup and does not exceed the correction stroke limit. To be more specific, by passing through the parallel shake correction target value gain change unit 171$p$ where a gain of 0.5 is set, the parallel shake correction target value is set to half of the original value.

Figure 17A:
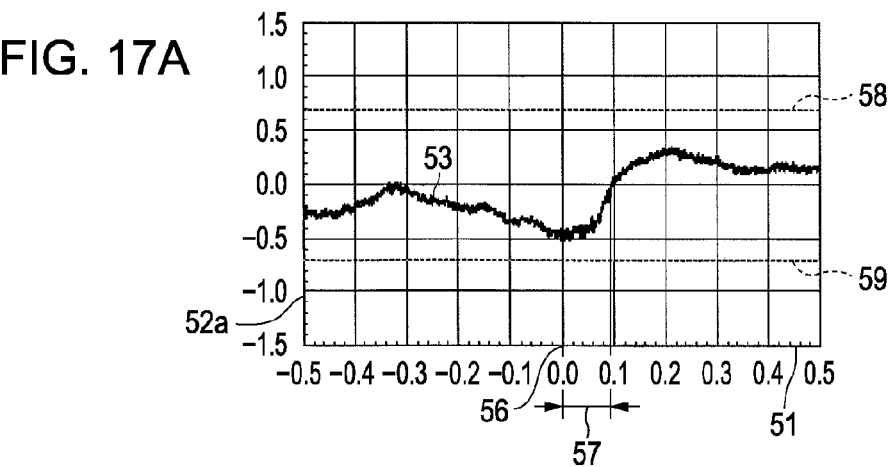
FIGS. 17A to 17C illustrate waveform examples of the parallel shake correction target value, the rotation shake correction target value, and the integrated shake correction target value, according to the third exemplary embodiment of the present invention.
Figure 17B:
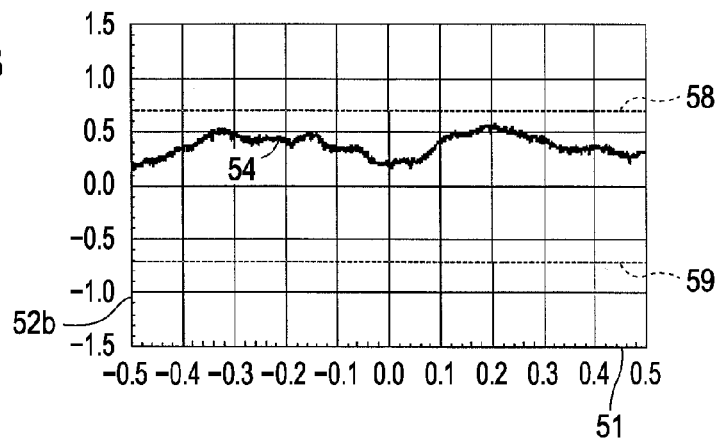
Figure 17C:
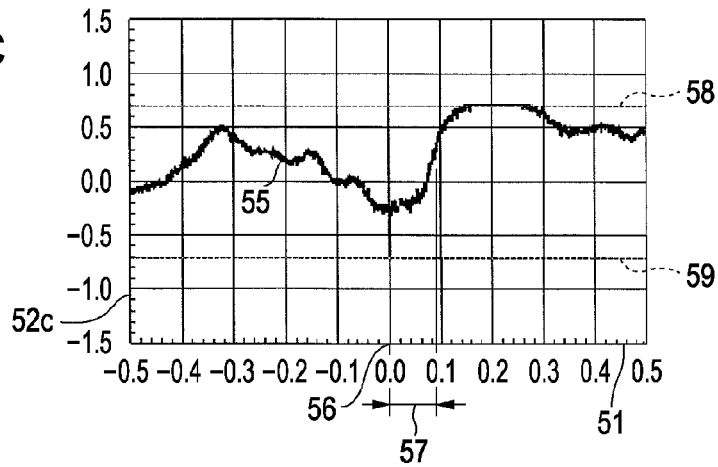

FIGS. 17A to 17C are diagrams for explaining the above-described target value waveforms. The same parts as before are allocated with the same reference numerals. FIG. 17A illustrates the parallel shake correction target value waveform 53. As understood from the comparison with FIG. 6A, the gain of the target value before and after the image pickup period 57 (herein, about 1/10 second) is set to 0.5. That is, during image pickup preparation, complete parallel shake correction is not performed (the rotation shake is sufficiently corrected). Then, only during image pickup, gain=1 is set by the parallel shake correction target value gain change unit 171$p$, and the parallel shake correction target value is output. For that reason, at the image pickup start time point, the parallel shake correction target value waveform 53 does not exceed the correction stroke and also the residual correction leftover for the parallel shake is not generated. However, during image pickup, satisfactory parallel shake correction is performed.

Figure 18:
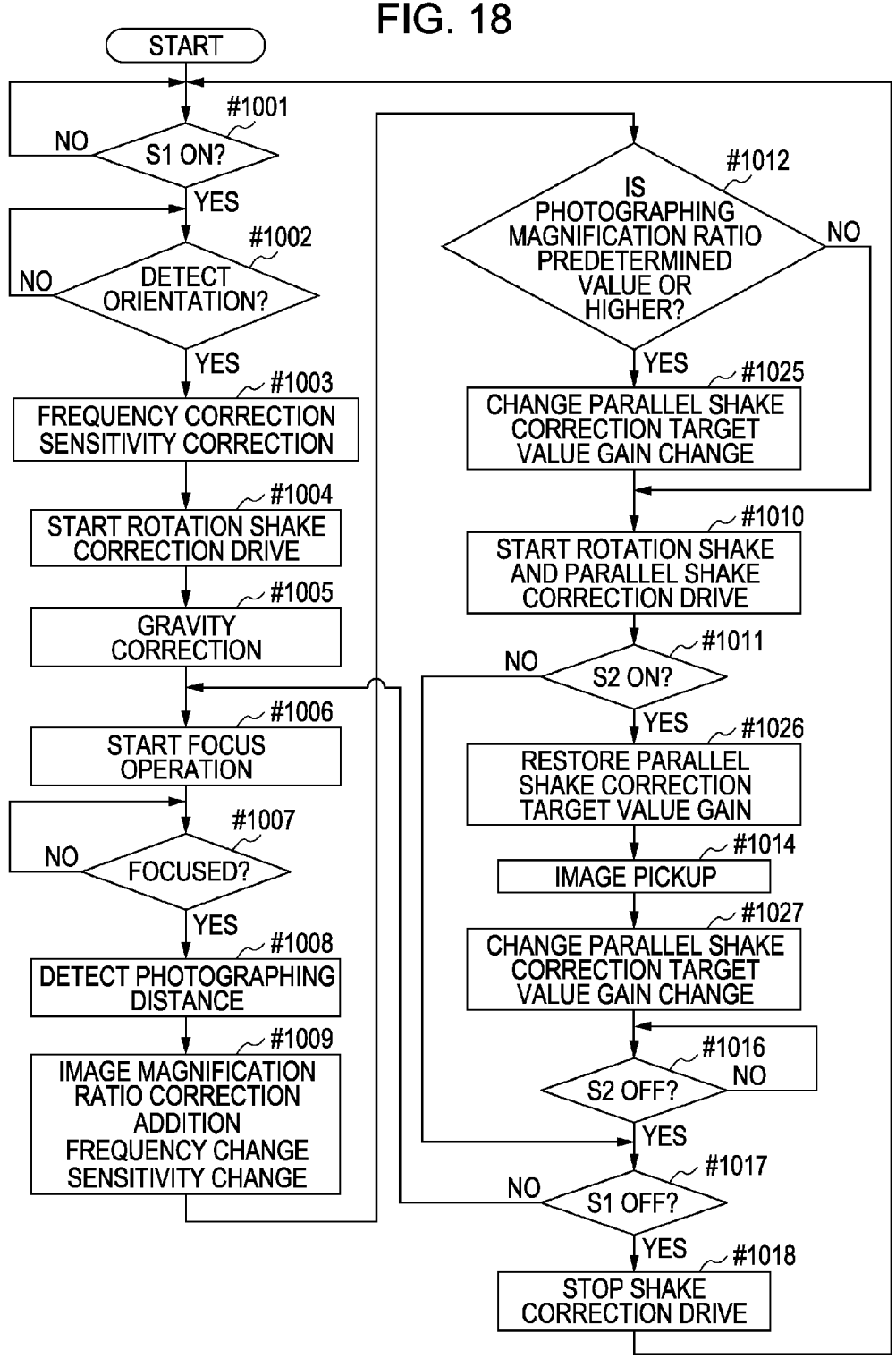
FIG. 18 is a flowchart illustrating operations for realizing the waveforms of FIGS. 17A to 17C.

FIG. 18 is a flowchart for describing the above-described operations. The flowchart of the previous flows and the parts performing the same operations are allocated with the same step numbers, and a description thereof will be omitted.

In FIG. 18, in Step #1012, when the object distance is such that the photographing magnification ratio is equal to or larger than a predetermined value (for example, 0.5×), the flow is advanced to Step #1025. When the object distance is not such that the photographing magnification ratio is equal to or larger than the predetermined value, the flow is advanced to Step #1010. In Step #1025, the parallel shake correction target value gain is set to half (0.5×). Next in Step #1010, with the integrated shake correction target value of the rotation shake correction target value and the parallel shake correction target value in which the gain is changed in the above-described manner, the shake correction unit 95 is instructed to start the shake correction.

Next in Step #1011, when the operation for the image pickup start (turning ON of the switch S2) is performed, the flow is advanced to Step #1026, where the gain of the parallel shake correction target value is returned to the original value of 1. That is, at the time of the image pickup, sufficient parallel shake correction is performed. Next in Step #1014, the image pickup is completed, and in Step #1027, the gain of the parallel shake correction target value is reduced again to continue the shake correction.

According to this example, the gain change during image pickup preparation and at the time of the image pickup for the rotation shake in FIG. 17B is not performed. However, for the purpose of ensuring the larger shake correction stroke during image pickup, the gain of the rotation shake correction target value may be set small up to a time before the image pickup as well. Alternatively, similarly to FIG. 14, etc., the integrated shake correction target value gain is controlled. When the object distance is close (the photographing magnification ratio is large), during image pickup preparation, the gain of the integrated shake correction target value is set small to prevent the using up of the shake correction stroke. Then, only during image pickup, the integrated shake correction target value is set to an appropriate gain such that sufficient shake correction may be performed.

It is noted that the description has been provided of the above-described example in which the gain is set 0.5×, but the present invention is not limited to this example. A smaller gain may be provided during image pickup preparation, the gain of the parallel shake correction target value may be set 0 (the parallel shake correction target value is output only at the time of the image pickup). Hereinafter, a modified example of the above-described embodiment will be described.

Figure 19A:
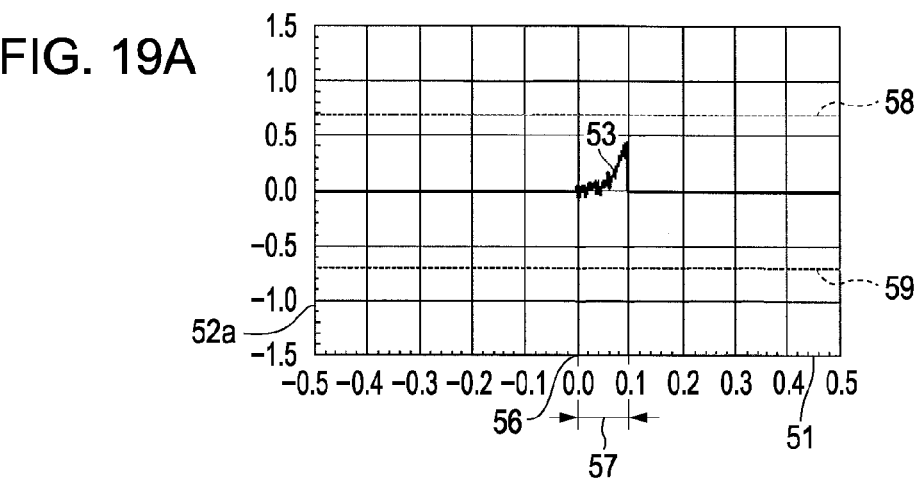
FIGS. 19A to 19C illustrate waveform examples of the parallel shake correction target value, the rotation shake correction target value, and the integrated shake correction target value according to the third exemplary embodiment of the present invention.
Figure 19B:
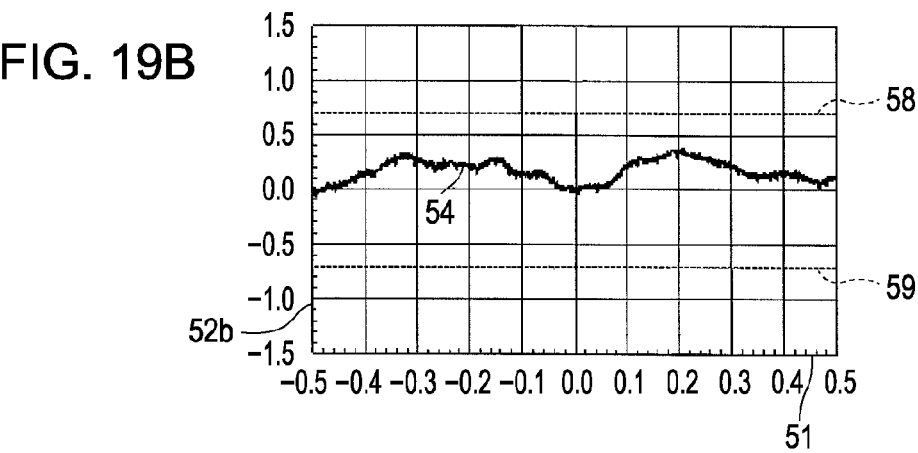
Figure 19C:
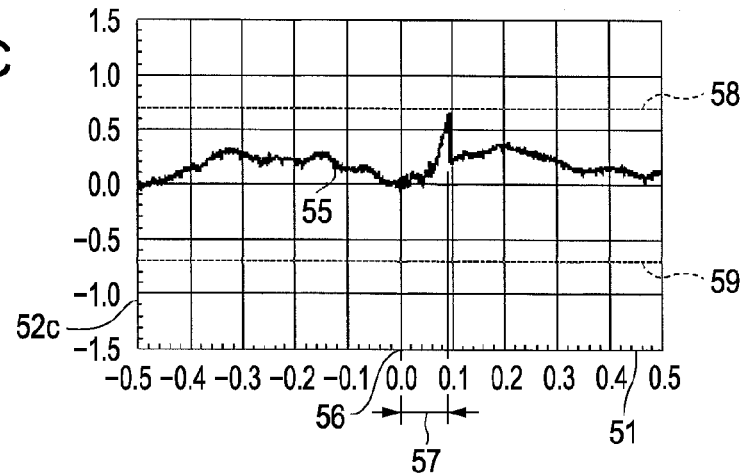

FIGS. 19A to 19C are diagrams for explaining the above-described configurations. The parallel shake correction target value in FIG. 19A is not output before the image pickup time point 56 and after the completion of the image pickup period 57. The rotation shake correction target value in FIG. 19B is output during the image pickup preparation. For that reason, as the integrated shake correction target value in FIG. 19C, during the image pickup preparation, only the rotation shake correction is output, and in the image pickup period, the signals of the parallel shake correction and the rotation shake correction are output. That is, the shake correction unit 95 corrects only the rotation shake during the image pickup preparation and corrects the parallel shake and the rotation shake only in the image pickup period.

According to the above-described third exemplary embodiment, the configuration pays attention to the fact that while the parallel shake correction performance during the image pickup preparation is decreased (the gain is lowered), the shake correction stroke at the time of the image pickup can be optimized.

To be more specific, the gyro 96$p$ arranged to detect the rotation shake about the image pickup optical axis and the angular rate integration unit 13$p$ arranged to process the rotation shake detection signal into the rotation shake correction target value are provided. Furthermore, the accelerometer 11$p$ arranged to detect the parallel shake in the plane surface perpendicular to the image pickup optical axis and the acceleration integration unit 22$p$ arranged to process the parallel shake detection signal into the parallel shake correction target value are provided. Furthermore, the shake correction unit 95 arranged to correct the image shake generated on the image plane of the camera due to the rotation shake and the parallel shake, based on the rotation shake correction target value and the parallel shake correction target value is provided. Furthermore, the parallel shake correction target value gain change unit 171$p$ arranged to vary the gain of the parallel shake correction target value during the image pickup preparation state and at the time of the image pickup of the camera is provided. Up to the time before the image pickup start, the parallel shake correction target value gain is set low by the parallel shake correction target value gain change unit 171$p$. Therefore, up to the time before the image pickup start, the shake correction unit 95 is set to be located in the initialization range set below 90% of the maximum shake correction range.

Also, the photographing distance detection unit 19 arranged to detect the distance to the object and the photographing distance corresponding unit 36 arranged to control the parallel shake correction target value gain change unit 171$p$ based on the object distance detection signal are further provided. When the object distance is short, the parallel shake correction target value gain change unit is activated, and at the time of the image pickup start, the shake correction unit 95 is set to be located in the initialization range set within the shake correction range.

In addition, the gyro 96$p$ arranged to detect the rotation shake about the image pickup optical axis and the angular rate integration unit 13$p$ arranged to process the rotation shake detection signal into the rotation shake correction target value are provided. Furthermore, the accelerometer 11$p$ arranged to detect the parallel shake in the plane surface perpendicular to the image pickup optical axis and the acceleration integration unit 22p arranged to process the parallel shake detection signal into the parallel shake correction target value are provided. Furthermore, the shake correction unit 95 arranged to correct the image shake generated on the image plane due to the rotation shake and the parallel shake, based on the rotation shake correction target value and the parallel shake correction target value is provided. Then, by the shake correction unit 95, the image shake is corrected up to the time before the image pickup based on the rotation shake correction target value. At the time of the image pickup, the image pickup is performed based on the rotation shake correction target value and the parallel shake correction target value. With this configuration, at the time of the image pickup start, the image shake correction performed by the shake correction unit 95 using the parallel shake correction target value is set to be located in the initialization range set within the shake correction range.

Also, the units arranged to detect the shakes (the rotation shake about the image pickup optical axis and the parallel shake in the plane surface perpendicular to the image pickup optical axis) (the accelerometer 11p and the gyro 96p) are provided. Furthermore, the units arranged to process the shake detection signal into the shake correction target value (the angular rate integration unit 13p, the sensitivity change unit 16p, and the acceleration integration unit 22p) are provided. Furthermore, the shake correction unit 95 arranged to correct the image shake generated on the image plane based on the shake correction target value and the photographing distance detection unit 19 arranged to detect the distance to the object are provided. Furthermore, the shake correction target value gain change unit 171p arranged to vary the gain of the shake correction target value in the image pickup preparation state and at the time of the image pickup (or, a gain change unit (not shown) for the integrated shake correction target value) is provided. Furthermore, the photographing distance corresponding unit 36 arranged to operate the shake correction target value gain change unit 171p based on the signal of the photographing distance detection unit 19 is provided. Then, up to the time before the image pickup start, the shake correction target value gain is set low by the photographing distance corresponding unit 36. Thus, up to the time before the image pickup start, the shake correction unit 95 is set to be located in the initialization range set within the shake correction range.

With the above-described configuration, it is possible to realize a small sized camera which can be developed into a consumer product. In other words, it is possible to provide a camera in which the parallel shake in the plane perpendicular to the image pickup optical axis can be corrected with high accuracy while the small size and the light weight of the camera are maintained.

Fourth Exemplary Embodiment

According to the first to third exemplary embodiments, the shake correction target value is initialized (reset) immediately before the image pickup, the shake correction target value is limited (the gain is set small) before the image pickup, such that the shake correction stroke at the time of the image pickup has a useful margin for operation below the maximum correction possible.

In contrast, according to a fourth exemplary embodiment of the present invention, a configuration is adopted such that during the image pickup, if the shake correction stroke has no margin to provide additional correction, the image pickup is prohibited, and the image pickup is delayed until the shake correction stroke again is able to provide a useful margin. Thus, the degradation of the rotation shake correction accuracy at the time of the image pickup is prevented.

Figure 20:
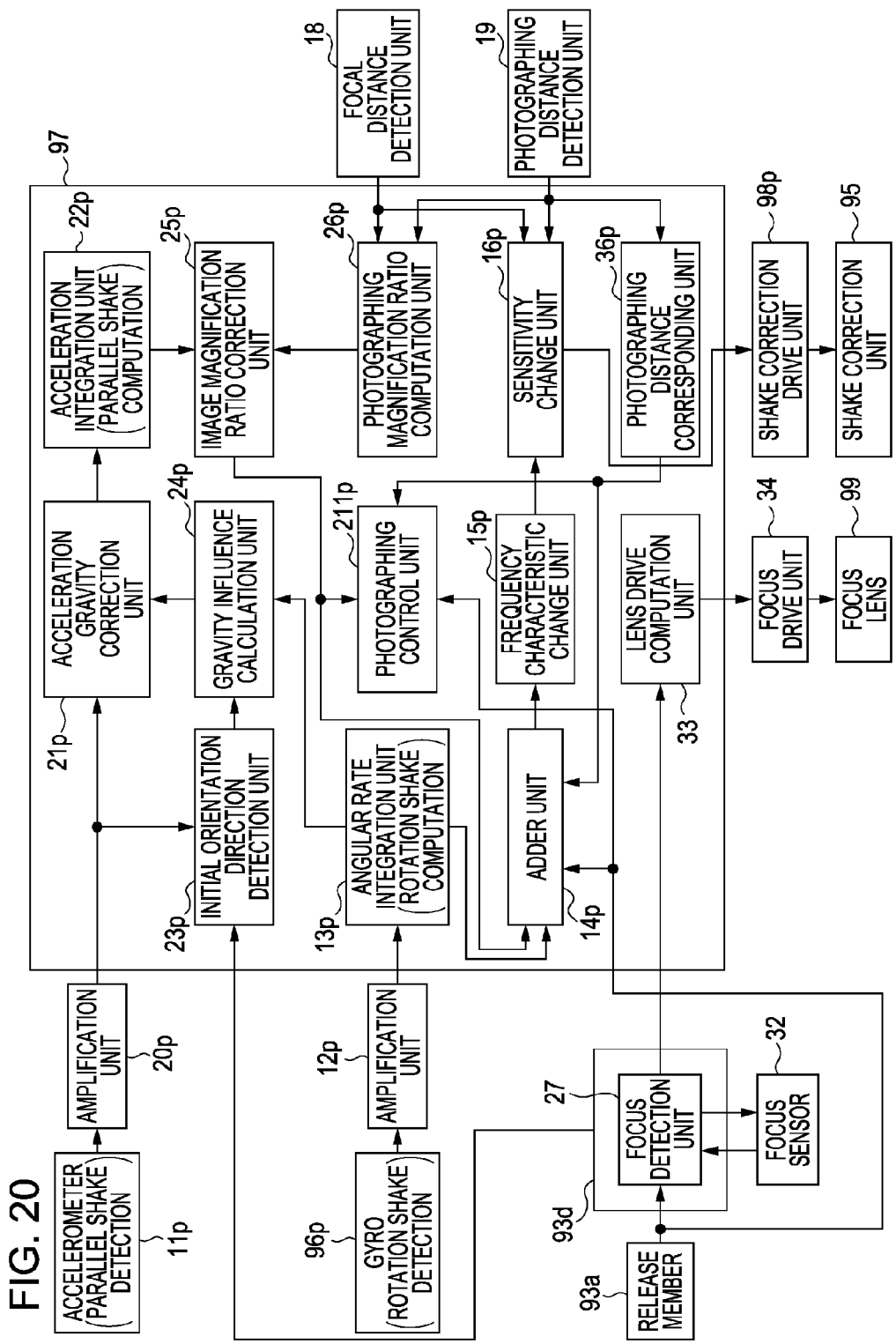
FIG. 20 is a block diagram of a circuit configuration example of the camera according to a fourth exemplary embodiment of the present invention.

FIG. 20 is a block diagram of the camera according to the fourth exemplary embodiment of the present invention. Instead of the parallel shake correction target value gain change unit 171p in FIG. 16, a photographing control unit 211p is provided.

The signal of the image magnification ratio correction unit 25p, the signal response to the full press operation of the release member 93a (the ON signal of the switch S2), and the signal of the photographing distance corresponding unit 36p are input to the photographing control unit 211p. Also, the parallel shake correction target value from the image magnification ratio correction unit 25p is input to the adder unit 14p as it is (the initialization or the gain change operation is not performed). Then, the photographing control unit 211p receives the above-described signal to control the photographing operation.

That is, the size of the parallel shake correction target value in the image magnification ratio correction unit 25p when the object distance is close (based on the signal of the photographing distance corresponding unit 36p) and also at the turning ON of the switch S2 (based on the signal of the release member 93a) is detected. When the amount exceeds 90% of the correction limit, the image pickup is prohibited and delayed. Here, the delaying of the image pickup means that the signal of the image magnification ratio correction unit 25p is continuously detected from the release full press operation, and when the amount is within 90% of the correction limit, the image pickup is started.

Figure 21:
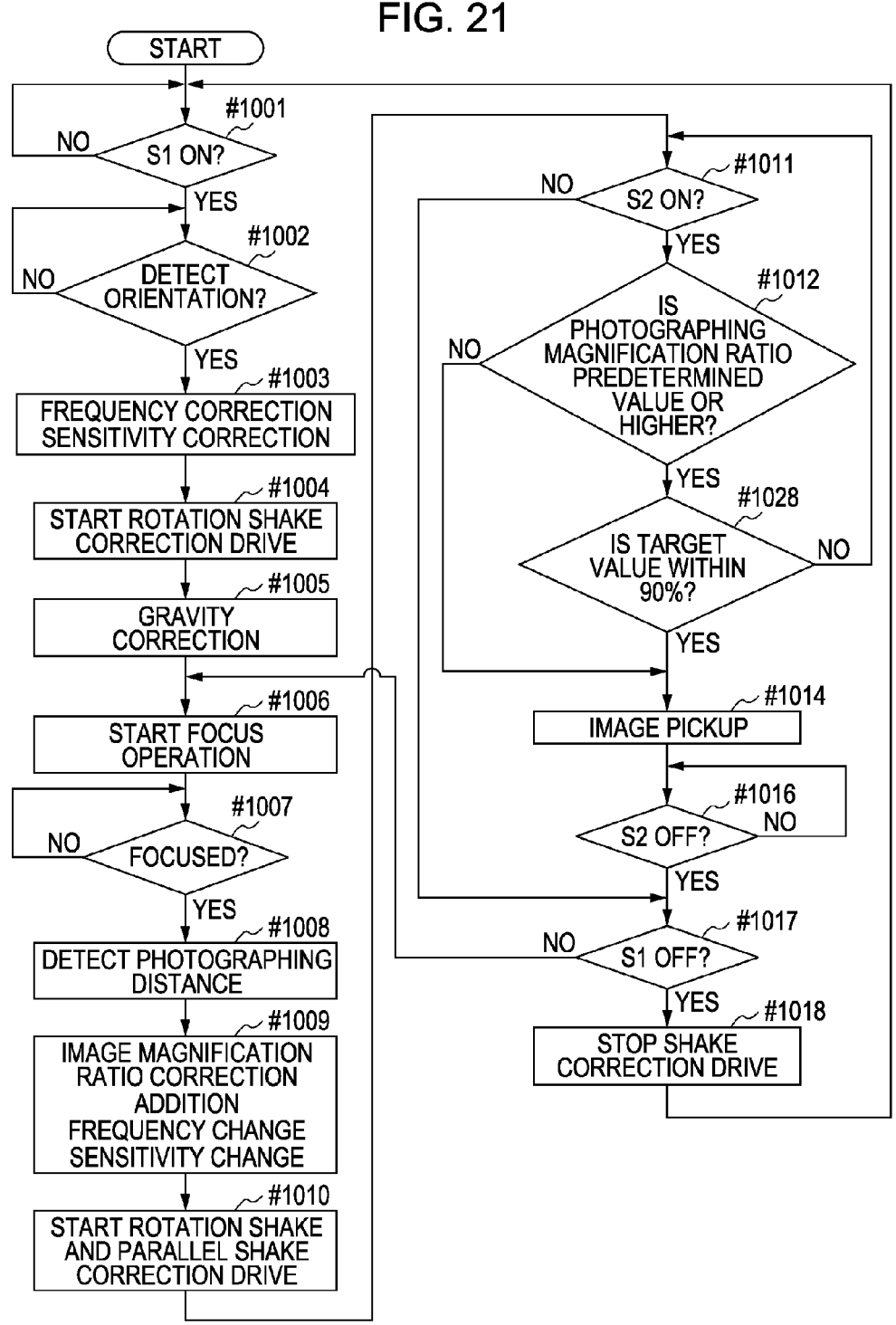
FIG. 21 is a flowchart illustrating operations of a main part of the camera according to the fourth exemplary embodiment of the present invention.

FIG. 21 is a flowchart for describing the above-described operations. The parts performing the same operations in FIG. 5 are allocated with the same step numbers, and a description thereof will be omitted. In FIG. 21, Steps #1013 and #1015 in FIG. 5 are eliminated, and Step #1028 is provided instead.

In Step #1011 in FIG. 21, the full press operation of the release member 93a is performed to turn ON the switch S2. Next in Step #1012, when the photographing magnification ratio is a predetermined value or higher (for example, 0.5× image pickup), the flow is advanced to Step #1028. In Step #1028, the parallel shake correction target value signal of the image magnification ratio correction unit 25p is regularly monitored, and when the value is smaller than 90% of the correction stroke, the flow is advanced to Step #1014, where the image pickup is started. However, if the value exceeds 90% of the correction stroke, the flow is circulated to Steps #1011→#1012→#1028 to stand by.

That is, when the photographing magnification ratio is equal to or greater than the predetermined value during the full press operation of the release member 93a, until the signal of the image magnification ratio correction unit 25p is returned to 90% of the correction stroke, the image pickup is prohibited and delayed. In this way, by controlling the image pickup side, the degradation in the image shake correction accuracy at the time of the image pickup can be prevented.

It is noted that herein, the size of the parallel shake correction target value is used for the determination of the image pickup prohibition and delay, but the present invention is not limited to the above. In other words, the image pickup prohibition and delay may be performed in a case where the photographing magnification ratio is high and also the integrated shake correction target value (the signal of the sensitivity change unit 16p) exceeds 90% of the correction stroke at the time of the full press operation of the release member 93a (turning ON of the switch S2).

According to the above-described fourth exemplary embodiment, such a configuration is adopted that at the time of the image pickup, when the shake correction stroke does not have a useful margin for operation, the image pickup is prohibited, and until the shake correction stroke has a useful margin, the image pickup is delayed.

To be more specific, the gyro 96*p* arranged to detect the rotation shake about the image pickup optical axis, the angular rate integration unit 13*p* arranged to process the rotation shake detection signal into the rotation shake correction target value, and the accelerometer 11*p* arranged to detect the parallel shake in the plane surface perpendicular to the image pickup optical axis are provided. Furthermore, the acceleration integration unit 22*p* arranged to process the parallel shake detection signal into the parallel shake correction target value, and the shake correction unit 95 arranged to correct the image shake generated on the image plane due to the rotation shake and the parallel shake based on the rotation shake correction target value and the parallel shake correction target value are provided. Furthermore, the photographing control unit 211*p* arranged to control the image pickup based on the size of the parallel shake correction target value is provided. Then, the photographing control unit 211*p* prohibits or delays the image pickup when the shake correction amount the shake correction unit 95 using the parallel shake correction target value exceeds the set ratio (90%) of the shake correction range.

With the above-described configuration, it is possible to realize a small sized camera which can be developed into a consumer product. In other words, it is possible to provide a camera in which the parallel shake in the plane perpendicular to the image pickup optical axis can be corrected with high accuracy while the small size and the light weight of the camera are maintained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-335064 filed Dec. 12, 2006, which is hereby incorporated by reference herein in its entirety.

What is claimed is:

1. An image stabilizing apparatus, including:
   a rotation shake detection unit arranged to detect a rotation shake generated in a direction perpendicular to an optical axis of the image stabilizing apparatus;
   a first processing unit arranged to process a detection signal of the rotation shake into a first correction amount;
   a parallel shake detection unit arranged to detect a parallel shake generated in a direction perpendicular to the optical axis of the image stabilizing apparatus;
   a second processing unit arranged to process a detection signal of the parallel shake into a second correction amount;
   a shake correction unit arranged to correct an image shake generated on an image plane of an image pickup apparatus based on the first correction amount and the second correction amount;
   an initialization unit arranged to initialize the second correction amount; and
   a control unit arranged to instruct the initialization unit to initialize, based on an image pickup start instruction of the image pickup apparatus, prior to a photographing operation, the second correction amount to move the shake correction unit.

2. The image stabilizing apparatus according to claim 1, wherein the initialization performed by the initialization unit includes setting the second correction amount to 0.

3. The image stabilizing apparatus according to claim 1, wherein the initialization performed by the initialization unit includes setting the second correction amount as a value at a predetermined ratio with respect to a shake correction range of the shake correction unit in accordance the second correction amount before the initialization.

4. The image stabilizing apparatus according to claim 1, further comprising a distance detection unit arranged to detect a distance from the image pickup apparatus to an object, wherein the control unit moves the shake correction unit in a case where the distance detected by the distance detection unit is smaller than a given value.

5. The image stabilizing apparatus according to claim 1, wherein the shake correction unit corrects the image shake generated on the image plane of the image pickup apparatus based on the first the correction amount without depending on the second correction amount before a focus operation of the image pickup apparatus is performed.

6. The image stabilizing apparatus according to claim 1, wherein the initialization unit performs the initialization so that the second correction amount to be within 90% of the correction range of the shake correction unit.

7. The image stabilizing apparatus according to claim 1, further comprising:
   a distance detection unit arranged to detect a photographing distance from the image pickup apparatus to an object;
   a focal detection unit arranged to detect a focal distance based on a position of a zoom lens; and
   a photographing magnification ratio computation unit arranged to calculate photographing magnification ratio based on the focal distance and the photographing distance,
   wherein the second processing unit processes the second correction amount by changing the detection signal of the parallel shake based on the photographing magnification ratio.

8. An image pickup apparatus comprising:
   an image stabilizing apparatus, including
   a rotation shake detection unit arranged to detect a rotation shake generated in a direction perpendicular to an optical axis of the image stabilizing apparatus;
   a first processing unit arranged to process a detection signal of the rotation shake into a first correction amount;
   a parallel shake detection unit arranged to detect a parallel shake generated in a direction perpendicular to an optical axis of the image stabilizing apparatus;
   a second processing unit arranged to process a detection signal of the parallel shake into a second correction amount;
   a shake correction unit arranged to correct an image shake generated on an image plane of an image pickup apparatus based on the first correction amount and the second correction amount;
   an initialization unit arranged to initialize the second correction amount; and
   a control unit arranged to instruct the initialization unit to initialize, based on an image pickup start instruction of the image pickup apparatus, prior to a photographing operation, the second correction amount to move the shake correction unit.

* * * * *